United States Patent
Duarte Braga

(10) Patent No.: US 12,460,520 B2
(45) Date of Patent: Nov. 4, 2025

(54) CONTROLLER FOR SUPPRESSING SLUGS IN PETROLEUM PRODUCTION SYSTEMS

(71) Applicant: PETROLEO BRASILEIRO S.A.—PETROBRAS, Rio de Janeiro (BR)

(72) Inventor: Dinart Duarte Braga, Vitoria (BR)

(73) Assignee: PETROLEO BRASILEIRO S.A.—PETROBRAS, Rio de Janeiro (BR)

( * ) Notice: Subject to any disclaimer, the term of this patent is extended or adjusted under 35 U.S.C. 154(b) by 319 days.

(21) Appl. No.: 17/761,001

(22) PCT Filed: Sep. 15, 2020

(86) PCT No.: PCT/BR2020/050365
§ 371 (c)(1),
(2) Date: Mar. 16, 2022

(87) PCT Pub. No.: WO2021/051178
PCT Pub. Date: Mar. 25, 2021

(65) Prior Publication Data
US 2022/0349281 A1 Nov. 3, 2022

(30) Foreign Application Priority Data
Sep. 17, 2019 (BR) .................. BR 102019019350-6

(51) Int. Cl.
*E21B 43/12* (2006.01)
*E21B 34/16* (2006.01)
(52) U.S. Cl.
CPC ............. *E21B 43/12* (2013.01); *E21B 34/16* (2013.01)

(58) Field of Classification Search
CPC .......... E21B 43/00; E21B 43/12; E21B 34/16; E21B 2200/09; G01F 1/74; G05B 13/0295
See application file for complete search history.

(56) References Cited

U.S. PATENT DOCUMENTS

| | | |
|---|---|---|
| 9,141,114 B2 | 9/2015 | Slupphaug |
| 9,926,761 B2 | 3/2018 | Massa De Campos |

(Continued)

FOREIGN PATENT DOCUMENTS

| | | |
|---|---|---|
| GB | 2429797 A | 3/2007 |

OTHER PUBLICATIONS

Dinart Duarte Braga, "Intelligent Control Strategies for Mitigation of Severe Slugging in Oil Production Systems", Aug. 29, 2017, pp. 1-148 (Year: 2017).*

(Continued)

*Primary Examiner* — Nicholas Klicos
(74) *Attorney, Agent, or Firm* — RAPHAEL BELLUM PLLC

(57) ABSTRACT

The invention solves the problem of the difficulty of acquiring subsea variables by using a widely available surface variable, namely the pressure upstream of the choke valve. As surface variables have an unfavorable dynamic for use in conventional anti-slug controllers, which are based on the linear PID algorithm, the proposed controller uses a hybrid fuzzy-PID architecture, which compensates for the unfavorable dynamic of the controlled variable by means of heuristic interventions in the control action generated by the PID part of the controller. The heuristic action of the proposed controller allows it to be more robust than a conventional controller, even with a relatively slow control action, which makes it possible to apply the proposed algorithm in systems whose choke valve activation is slow.

(Continued)

Thus, the two largest impediments for installation of conventional controllers, lack of subsea measurement and choke valve slowness, do not pose a problem for application of the proposed algorithm. This allows the proposed anti-slug controller to be used in offshore production systems without the need for physical intervention in the subsea or surface facilities.

14 Claims, 17 Drawing Sheets

(56) References Cited

U.S. PATENT DOCUMENTS

| | | | |
|---|---|---|---|
| 2008/0163692 A1* | 7/2008 | Huang | G01K 1/143 |
| | | | 374/E1.019 |
| 2008/0234939 A1* | 9/2008 | Foot | E21B 47/06 |
| | | | 702/12 |
| 2010/0023269 A1* | 1/2010 | Yusti | E21B 43/00 |
| | | | 702/12 |
| 2015/0368999 A1* | 12/2015 | Massa de Campos | ............... |
| | | | E21B 33/0355 |
| | | | 700/282 |
| 2017/0075324 A1* | 3/2017 | Santiago | G05B 13/0295 |
| 2017/0167228 A1* | 6/2017 | Maughan | E21B 43/00 |
| 2017/0216516 A1* | 8/2017 | Dale | A61M 5/1689 |
| 2017/0292351 A1* | 10/2017 | Boiko | E21B 43/122 |
| 2018/0004234 A1* | 1/2018 | Dursun | G05D 7/0635 |
| 2018/0172217 A1* | 6/2018 | Brenskelle | F17D 1/005 |
| 2022/0268270 A1* | 8/2022 | Ralls | F04B 49/06 |

OTHER PUBLICATIONS

International Search Report of PCT International Application No. PCT/BR2020/050365, dated Nov. 3, 2020.

Braga, Dinart Duarte, "Estrategias de Controle inteligente para mitigayao de golfadas severas em sistemas de produyao de petroleo", Pontificia Universidade Catolica do Rio de Janeiro—PUC/RJ, Dissertacao de Mestrado, Rio de Janeiro (Aug. 29, 2017). (English Abstract p. 6).

Ashikawa, Fabio Hideki, "Mitigacao de golfadas em sistemas offshore utilizando modelo dinamico simplificado", Escola Politecnica da Universidade de Sao Paulo, Dissertacao de Mestrado, Sao Paulo, 2017. (English Abstract p. 8).

Havre, K., et.al, "Taming Slug flow in pipelines", ABB Review Apr. 2000, Oil & Gas, pp. 55-63.

Almeida, Brena Rocha, JOTA, Fabio Goncalves, "Mitigacao dos efeitos da golfada severa por sistemas supervisionados de controle adaptativo", X SBAI—Simposio Brasileiro de Automacao Inteligente, Sao Joao del-Rei, Minas Gerais, MG, Brasil (Sep. 18-21, 2011), pp. 135-140.

\* cited by examiner

Time (seconds)

Time (seconds)

CONTROLLER FOR SUPPRESSING SLUGS IN PETROLEUM PRODUCTION SYSTEMS

FIELD OF THE INVENTION

Since modern industry began commercial exploration for oil in the middle of the nineteenth century, demand for it has increased continuously as it is a raw material for products that are essential to modern life, such as fuels and petrochemicals. In addition, organizations such as the International Energy Agency (IEA) and the Organization of the Petroleum Exporting Countries (OPEC) project growth on the order of 20% of demand until 2040, even in a scenario in which countries fulfill their climate commitments assumed under the Paris Accord of 2015, which imposes lower greenhouse gas emissions.

Meeting this growing demand has become an increasingly difficult challenge since the reservoirs from which oil can be easily extracted have become rarer, as their exploration was prioritized in the past due to the lower costs involved. The oil from these fields, which is often called "easy oil," represented 75% of production in 1990, but by 2040 it is expected to represent only 25% of global production.

The remaining production is extracted from reservoirs whose exploration is more complex, due to being located in logistically difficult regions, such as deep water or ultra-deep water, or because they contain oil with low or extremely low viscosity, which renders the extraction process enormously difficult.

This increased complexity in looking for new discoveries has justified a greater interest in increasing the oil recovery factor in fields that are already in production. However, this means that adjustments need to be made to the production systems so they will be able to operate economically, even in mature reservoirs, which are characterized by reduced internal pressure and by the consequent difficulty in production flow.

In Brazil, several mature fields, such as Marlim and Albacora, will be undergoing this process of adjusting their production systems with the objective of extending their economic useful life, allowing an oil recovery factor that is higher than what can be attained with current systems. In the case of Marlim, the project was named "Marlim Revitalization," and it includes the installation of two new production platforms to replace the nine platforms in operation, in addition to a major rearrangement of the subsea systems.

Among the adjustments to be made in these fields is the interconnection of a large number of wells to a single production platform, often resulting in networks of subsea pipes of significant lengths and different pressure and temperature conditions. The major challenge of these arrays is to ensure the flow of the multiphase mixture of oil, gas, and water produced in the wells through these long sections of horizontal and vertical pipes to the production platforms. This challenge is even greater in mature fields, whose low reservoir pressure hinders flow with favorable characteristics.

Among the phenomena that may negatively impact the flow are problems that are physicochemical in nature, such as wax deposits, hydrate formation, and line corrosion, and also problems of a physical nature, such as the establishment of a flow phenomenon known as severe slugging, characterized by periodic, large-amplitude oscillations in the flows of liquid and gas, which decrease the efficiency of the separation process from the production platform, and that may cause damage to the reservoir structure, the pipes, and the platform equipment. This phenomenon occurs when the liquid produced in the well blocks the passage of gas from the horizontal subsea pipe (flowline) to the vertical section (riser), causing gas to accumulate along the horizontal section, and liquid to accumulate in the riser, as shown in FIG. 1.

The cyclical process of severe slugging has four stages, as shown in FIG. 2. The first is the blocking stage, which begins when, due to gravitational action, the liquid produced in the well accumulates in the base of the riser and blocks the passage of gas flowing through the flowline. This condition only occurs when both the flow of liquid and the flow of gas are sufficiently low, to the point of creating the conditions necessary to establish a type of flow that makes such blockage possible, such as stratified flow. This is why production systems with stable flows present severe slugging as the reservoirs mature, and consequently the flow produced decreases.

With the base of the riser blocked by liquid, the accumulation stage begins, characterized by pressurization of the flowline by the gas, now blocked, and by the gradual filling of the riser with liquid, increasing the pressure at the base of the riser due to the hydrostatic pressure in the column. These two pressures continue to increase while the pressure at the base of the riser is greater than the pressure of the flowline. Since the hydrostatic pressure of the column of liquid is limited by the finite length of the riser, the pressure in the flowline will eventually exceed the pressure at the base of the riser.

At the moment at which this over-pressurization occurs, the stage of slugging production occurs, in which the gas acquires sufficient pressure to push the accumulated liquid outside of the riser, while the gas also starts axially penetrating the volume of liquid. As the liquid is expelled from the riser, the pressure of the flowline decreases, causing the gas to expand and consequently the flow speeds to increase, with positive feedback that in large part explains the severity of this type of slugging.

After the majority of the gas and liquid has exited the riser, the gas ceases to expand, causing its speed to decrease, which at a certain point becomes insufficient to push the liquid up, thus the fallback stage begins. In this stage, the liquid present in the riser, mainly in the annular region, initiates a reverse flow in the direction of the base of the riser, due to gravitational action. Eventually, accumulation of this liquid at the base of the riser again blocks the passage of gas, beginning a new slugging cycle.

The large variations in flows and pressures arising from the process described above have several negative consequences, such as decreased efficiency in the separation process, which can cause the water discarded into the ocean to have oil concentrations that are higher than the limit established by the environmental agency, resulting in costly fines for the company operating the field. Deficient separation also impacts oil loads due to excessive water content, which often cannot be delivered to the purchaser because of the contractual quality requirements for the product, resulting in the need for reprocessing. Since both situations are undesirable, plants with low separation efficiency have decreased processed flow, causing significant financial losses due to the decrease in production.

If large variations in inflows occur at the separation plant, equipment that is subject to these variations, such as control valves, export pumps, and gas compressors, tend to have reduced reliability and useful life. This has repercussions on increased maintenance costs at the processing plant, and on the costs associated with production losses due to failures in this equipment.

Finally, slugging may also result in loss of control in processing, with a sudden increase or decrease in the level of the separation tanks, causing emergency stoppages, and in more serious cases, oil spills into the ocean, or oil leaks into the gas compressor, which is extremely damaging to the equipment.

Due to the high potential for damage from severe slugging, whenever a system develops slugs, alternatives are sought to reestablish flow stability, such as redesign and replacement of subsea pipes, injection of gas into the base of the riser, partial close of the production inlet valve (static choking), and active control of the production entry valve (dynamic choking).

The first two solutions mentioned involve replacement or addition of new subsea facilities, and therefore they are rarely used due to the high cost involved. In the majority of cases, well flow stabilization is achieved by actuation of the production inlet valve (choke valve), which is more often done statically than through active control.

Static actuation, which consists of keeping the choke valve partially opened, is a solution that is often used, as it is effective in stabilizing flow without a need for installation of additional equipment. However, this solution causes increased pressure at the wellhead, causing a decrease in oil production, and consequently financial losses.

Actively controlling the choke valve opening allows the same stabilization in the production flow, with lower pressure at the wellhead when compared to that obtained using the static choking technique, and therefore it provides greater production. However, the majority of successful cases of use of active control requires measurement of some subsea pressure, such as pressure at the wellhead or at the base of the riser, which are usually extremely difficult to acquire as they require the installation of instruments on the ocean floor, and costly subsea maintenance, which can only be performed by specialized vessels. Therefore, these measurements are often not available, either due to the absence of the instrument, or due to failure caused by lack of maintenance.

The literature indicates that the vast majority of the results obtained through active control of the top variables, such as pressure upstream of the choke valve, were not as favorable as those obtained through control of the bottom variables. Additionally, analyses of controllability indicate that these variables are not good for controlling the stability of production systems due to the location of the zeros of the function of corresponding transfer on the right side of the complex plane.

Considering the increased occurrence of severe slugging due to oil field maturation, the losses caused to production systems and the difficulty of suppressing them in the absence of subsea measurements, a new dynamic controller was invented, based on linear and non-linear techniques, which is capable of eliminating slugging in production systems based on just surface variables, and thus allowing production gains in relation to static choking. This invention is described in detail throughout this document.

DESCRIPTION OF THE STATE OF THE ART

Due to the high potential for damage from severe slugging, in recent decades several techniques were developed in order to prevent the formation of slugs, or at least to attenuate their harmful effects on production systems. These techniques differ greatly in several aspects, such as regarding the principle of operation, the requirement for change in facilities, the location of the intervention (subsea or on the surface) and the cost of implementation. These characteristics determine the viability of applying solutions.

One possible way of intervening in the mechanism of slug formation, seeking to eliminate it, is to decrease the internal diameter of the flowline. This alteration causes the speed of flow of the fluids to increase, preventing flow in the flowline that is conducive to formation of severe slugging, with stratified flow.

In a field study in the gigantic Upper Zakum field in the United Arab Emirates, Fargharly (*Study of severe slugging in real offshore pipeline riser-pipe system, Proceedings SPE Middle East Oil Show*, Mar. 7-10, 1997), reported that the optimization of the internal diameter of the flowline is capable of alleviating the occurrence of severe slugging, although it is not capable of eliminating slugging completely. The biggest problem with this solution is that replacing a flowline is a very high-cost activity, to the point of being unviable. In addition, the ideal diameter of the pipe depends on the characteristics of the reservoir, which change over the exploration period, thus this solution is not very robust.

Another way of intervening in the mechanism of slug formation is by means of changes in the geometry of the flowline, as proposed by Makogan and Brook of British Petroleum (Device for controlling slugging, England, Patent 2007/034142, 2007), who patented a device that may be described as an inverted U-shaped pipe installed immediately before the riser, as shown in FIG. 3. The creators of the device allege that their invention decreases the length of the slugging and increases their frequency, causing severe slugging to degenerate into plug flow, which could be easily attenuated by the slow dynamic of the tanks of the primary separation plant. However, at this time no results have been released that support these allegations, even in simulated environments, which raises doubts about the efficacy of the technique.

Severe slugging can also be avoided by facilitating the lift of the liquid by injecting compressed gas at the base of the riser, thus preventing the accumulation of liquid that blocks the passage of gas. To do this, some of the produced gas must be compressed and injected into the base of the riser through a pipe that goes from the surface installation to the ocean floor, as shown in FIG. 4. The literature presents several successful cases of use of this technique, both in experimental environments (JANSEN, F. E. *Method of eliminating pipeline-riser flow instability, Proceedings SPE Western Regional Meeting*, Mar. 23-25, 1994), and in industrial applications (ALVAREZ, C. J.; AL-MALKI, S. S. *Using gas injection for reducing pressure losses in multiphase pipelines, Proceedings SPE Annual Technical Conference and Exhibition*, Oct. 5-8, 2003). However, there are often reports that injecting gas at the base of the riser degraded the system's flow conditions, even triggering the formation of hydrodynamic slugs in systems that presented stable flow (AL-KANDARI, A. H.; KOLESHWAR, V. S. *Overcoming slugging problems in a long-distance multiphase crude pipeline, Proceedings SPE Annual Technical Conference and Exhibition*, Oct. 3-6, 1999).

One factor that explains the contradicting results of injection into the base of the riser is that the success of the technique is heavily dependent on using adequate gas flow in each flow scenario, which is often not an easy task. In addition, various studies have concluded that the flow necessary to stabilize a system with severe slugging is extremely high, to the point that the associated cost of compression becomes prohibitive, and therefore makes the technique for industrial applications unviable.

Another solution, which is quite similar to the one described above, consists of using the gas available in the flowline to help lift the liquid, as shown in FIG. 5. This method seeks to form a self-regulating system, whose greatest advantage is the fact that it does not need an additional source of gas. However, this same advantage may become a problem if the gas flow is not sufficient to stabilize the flow. Among the disadvantages of this method are the need to develop a strategy to control the valve efficiently, and the large costs associated with the extensive modifications of the subsea installation.

Since severe slugging occurs exclusively in multiphase flows, it is possible to avoid them by means of homogenization of the fluids produced. One way to achieve this objective is to inject tensoactive chemical elements in the flowline (CAMPOS, M. C. M.; LAURERO, P.; BORGES, A. M. New control strategies for the P-55 oil platform, *Rio Oil and Gas Expo and Conference*, Rio de Janeiro, 2006), which reduce the surface tension of the liquid, causing the fluids to mix in a homogeneous foam. In addition to the financial cost associated with continuous injection of the tensoactive element is the need for subsea installation. The major disadvantage of this method is a drastic fall in the separation efficiency of the surface facility, with consequences that are potentially worse than those arising from the slugging.

In addition to the subsea solutions, there are also solutions that are based on alterations to the surface facility, which is the case with slug catchers. This solution installs tanks downstream of the choke valves, which serve as buffers for the liquid slugs coming from the riser. However, this solution is unable to prevent formation of slugging, but by attenuating the brusque variations of the slugs, their impact on the processing plant is mitigated. In practice, slug catchers differ little from a production separator and their installation may be characterized as the addition of a new separation stage from the plant, with the differential that they are tanks that are sufficiently large to buffer the liquid slugs generated by the system to which they are connected.

In systems subject to severe slugging, in which they may be as long or longer than the risers themselves, sometimes kilometers long, the slug-catcher tanks need to be very large to be able to buffer the slugs adequately. This makes installation of this equipment on existing platforms practically unviable, as there is usually not sufficient free space on deck, or structural capacity for installation of this additional load.

The most popular technique for suppressing slugs in production risers is static choking, which consists of partial closure of the choke valve downstream of the riser IOGAZI, A. I. *Multiphase Severe Slug Flow Control*, Cranfield: PhD Thesis, 2011), having been suggested originally by Schmidt (*Choking can eliminate severe pipeline slugging*, Oil and Gas Journal, pp. 230-238, 1979). The operating principle of this technique is based on two phenomena that intensify as the choke valve is closed. The first is an increase in operating pressures, which causes a decrease in system compressibility, thus making it more stable. The second phenomenon is an increased drop in pressure due to friction along the choke valve as long as there is an increase in the outflow from the riser, causing an additional stabilizing effect.

The popularity of static choking is due to its relative simplicity of application because it does not require the installation of equipment in addition to the subsea or surface facilities, and it does not depend on the development and alignment of control algorithms. However, the static choking has a great disadvantage, which is the increase of pressures at the wellhead, which results in reductions in the flows of oil and gas produced.

Another possibility for suppressing slugs is through use of closed-loop controllers that dynamically manipulate the opening of the choke valve in response to the disturbances in the system. This technique is called "dynamic choking," and the controllers that execute it are usually called "Anti-Slugging Controllers." Those controllers have the interesting characteristics of stabilizing a non-oscillating flow system in the same boundary conditions in which slugging would occur if there were no control (STORKAAS, E. *Stabilizing Control and Controllability: Control Solutions to Avoid Slug Flow in Pipeline-Riser Systems*, Trondheim: PhD Thesis, 2005).

The idea of stabilizing flow in conditions of unstable profiles might be better understood by looking at the Hopf bifurcation diagram in FIG. 6. In this diagram, which shows the pressure from the flowline from a production system that is subject to slugging, it can be seen that for choke openings smaller than a certain critical value—close to 13%— the flow is inherently not oscillating. This critical value represents the limit of the static choking technique.

When operating this system without active control and with larger choke openings than this critical value, severe slugging occurs in the system and the pressure from the flowline starts to oscillate between a high value, $P_{max}$, and a low value, $P_{min}$. These two pressures for each choke opening are shown in the continuous lines of the diagram. However, when the choke valve is controlled actively, a permanent, non-oscillating solution in valve openings can be obtained that would create instabilities in an open-loop system. These points of operation are represented by the dotted line in the Hopf diagram.

It is interesting to note that in addition to eliminating slugging from the system, actively controlling the choke stabilizes the flow with pressure in the flowline that is significantly lower than the minimum pressure obtained with static choking, as shown in FIG. 6. This reduction in pressure has the direct consequence of a greater flow of produced oil and gas, increasing the profitability of the business.

Although the advantages of actively controlling the choke valve have been verified experimentally by Schmidt [*Choking can eliminate severe pipeline slugging, Oil and Gas Journal*, pp. 230-238, 1979], and Hedne [*Suppression of terrain slugging with automatic and manual riser choking, Advances in Gas-Liquid Flows*, pp. 453-469, 1990], in 1979 and 1990, respectively, no industrial application of the algorithms developed was released until a resurgence of interest in these techniques over the last two decades.

In 1996, Courbot [*Simulation of process to control severe slugging: Application to the Dunbar pipeline, SPE Annual Conference and Exhibition*, Houston, 1999] presented an automatic system that was capable of preventing slugging in a production system located in the Dunbar field located in the North Sea. The system gradually closed the choke as long as the pressure at the base of the riser was lower than a determined minimum pressure, corresponding to the peak pressure during a slugging cycle, thus avoiding slug formation. While this system forestalled the formation of slugs, it only automated the old static choking strategy without in fact being able to stabilize the flow in inherently unstable conditions of contorno and, therefore, it did not generate production gains.

The first explicit demonstration of a controller capable of stabilizing an unstable point of operation in an industrial application was presented by Havre [Taming slug flow in pipelines] in a technical magazine published by ABB, in 2000. This publication presented the results obtained using the patented SlugCon® controller in the Valhall field, located in the Norwegian North Sea. This controller used the opening of the choke valve as a manipulated variable, and an average of pressure measurements close to the well as a controlled variable. A result that was unexpected at that time that was presented in this work was the fact that slugs reformed in the system whenever the controller was not connected and the choke valve was kept in the last position defined by the algorithm, confirming the controller's capacity to stabilize an unstable point of operation.

Dalsmo [*Active Feedback Control of Unstable Wells at the Brage Field, SPE Annual Technical Conference and Exhibition*, San Antonio, 2002] also obtained promising results in the Brage field in 2002, with the same controller used by Havre. In his work, he reports reliability issues in measuring pressure at the wellhead, which resulted in disconnecting the automatic control, leading to the recurrence of severe slugging in the system. This problem is recurring in subsea measurements (bottom) since the instruments are difficult to maintain and are often unavailable.

Storkaas [*Stabilizing Control and Controllability: Control Solutions to Avoid Slug Flow in Pipeline-Riser Systems*, Trondheim: PhD Thesis, 2005] was one of the first to perform a formal analysis on an offshore production system subject to slugging in 2005. In this analysis, the theory of control was used to perform stability and controllability analyses on the system, considering the opening of the choke valve as a manipulated variable, and different magnitudes as a controlled variable. One of his most interesting results was the theoretical confirmation that the best variable to be used in anti-slugging control is the pressure on the flowline, by virtue of the function of corresponding transference not containing zeros on the right side of the complex plane, which characterizes a minimum-phase system, which is more easily controlled. Drengstig [*Slug control of production pipeline, Technical Report N-4091 of Stavanger University College, School of Science and Technology*, Ullandhaug, 2001] had reached that same conclusion experimentally, indicating the pressure of the flowline as an optimal variable for control.

In the conclusion of his thesis, Storkaas states that when only top measurements are available, such as gas pressure in the riser, fundamental limitations of the process (non-minimum phase and low gain) impede the use of SISO anti-slug controllers. However, it is noted that there might have been other physical measurements or non-linear combinations of the available measurements that do not have these fundamental limitations, allowing the development of SISO anti-slug controllers only with top measurements.

Very possibly, by virtue of the difficulty of using top magnitudes as the controlled variable in anti-slugging control algorithms, there are not many reports of successful industrial applications of controllers that use this approach.

A notable exception is the controller developed at Cranfield University, the Inferential Slug Control (ISC®), patented in 2010 and tested in a producing field in the North Sea in 2011. The ISC is an MISO (Multiple Input Single Output) controller that has an adjustable number of top inputs, and whose only output is the position of the choke valve. Its algorithm is based on use of the Principal Components Analysis (PCA) technique to the controller's inputs, with the objective of synthesizing a fictitious variable formed by a linear combination of the inputs of the controller, which has maximum variance during the occurrence of the slugs. This variable is called the Principal Component (PCP).

After application of the PCA, a reference (setpoint) value is defined for a controller whose controlled variable is this fictious magnitude. The output of this controller is given by the rule of control presented below:

$$z(t) = z_0 + k(W^T X(t) - R)$$

where:
- $z(t)$ is the output of the controller, choke opening;
- $z_0$ is a value of the choke opening in which severe slugging does not occur, determined experimentally;
- $X(t)$ is the vector of the inputs used in the controller;
- $W$ is a vector of weights of the linear combination that forms the PCP;
- $R$ is the reference value of the controller in terms of the PCP;
- $K$ is the gain from the controller.

Observing the ISC control equation, it may be concluded that it implements a pure proportional controller in terms of the first principal component (PCP).

An interesting functionality of this controller is that the controller periodically increases the value of $z_0$ and assesses whether the system began to present severe slugging. If so, $z_0$ is returned to the previous value. If not, a new analysis is performed on principal components, to update the values of R and W.

Analyzing the controller, it is seen that the regulation capacity, and therefore the stabilization of an unstable point of operation, is guaranteed by the proportional controller. The periodic increase of the choke valve opening replicates the action of the operators by using the static choking technique, with a gradual opening of the valve up to the flow stability limit.

This controller was initially tested both by using a computer model and by experimental tests in a multiphase flow laboratory. Ten input variables were used in these tests, including pressures, outflows, levels, and gamma ray emissions. The results were positive, with stabilization of the flow and an increase in the outflow produced.

More recently, the control algorithm was tested in a field in the North Sea. Twelve variables were used from the processing plant in this implementation, and the controller was able to reduce the amplitude of the slugs in half, even though several disturbances that occurred in the plant throughout 42 hours of testing had to be dealt with. In addition, the authors attribute an observed increase in well production to the controller.

Document BR1020130305715A2 reveals a system that is able to control slugging during production in oil wells using PID or ONFC-type controllers. Document US20160084063A1 reveals a process capable of controlling slugging during production in oil wells using linear PID-type controllers and sensors positioned upstream of the choke valve. Document US20130220417A1 reveals a method and an apparatus capable of controlling slugging during production in oil wells using PID-type controllers, with computer algorithms and sensors positioned upstream of the choke valve. Document GB2429797A reveals a system capable of controlling slugging during oil well production using fuzzy-type controllers, with computer algorithms and outflow sensors positioned upstream of the choke valve. While these documents cited as the state of the art reveal methods, processes, or systems capable of controlling the slugging that occurs during oil well production by means of controllers, sensors, and computer algorithms, none of them incorporate heuristic knowledge of the process through a fuzzy-PID hybrid configuration and only use the surface measurement, as the invention presented in this work does.

SUMMARY DESCRIPTION OF THE INVENTION

In recent decades, several techniques were developed that are capable of eliminating severe slugging by actively controlling the inbound production valves. However, the vast majority of these techniques require the measurement of some subsea magnitude, such as pressure at the wellhead, and a fast-action valve. These requirements significantly limit the applicability of these techniques.

The invention described in this document is an anti-slugging controller capable of stabilizing the flow just using an easily obtainable surface measurement, such as pressure upstream of the choke valve. To offset the unfavorable dynamic of this type of measurement, a hybrid fuzzy-PID control algorithm was used, in which the fuzzy parcel of the algorithm compensates for the limitations of the PID controller through heuristic interventions.

In addition to effectively suppressing slugging, the heuristic actions of the invented controller are more robust than classic controllers, even in systems whose choke valve action is slow. Thus, the two greatest impediments for installation of anti-slugging controllers, which are the absence of subsea measurement and slowness of the choke valves, are not a problem for use of the invention, thus they can be installed in offshore production systems without the need for physical interventions in the subsea or surface facilities.

BRIEF DESCRIPTION OF THE DRAWINGS

This invention will be described in more detail below, referencing the attached figures which, in a schematic manner not limitative of the inventive scope, show examples of its realization. The drawings include the following.

DETAILED DESCRIPTION OF THE INVENTION

Figure 1:
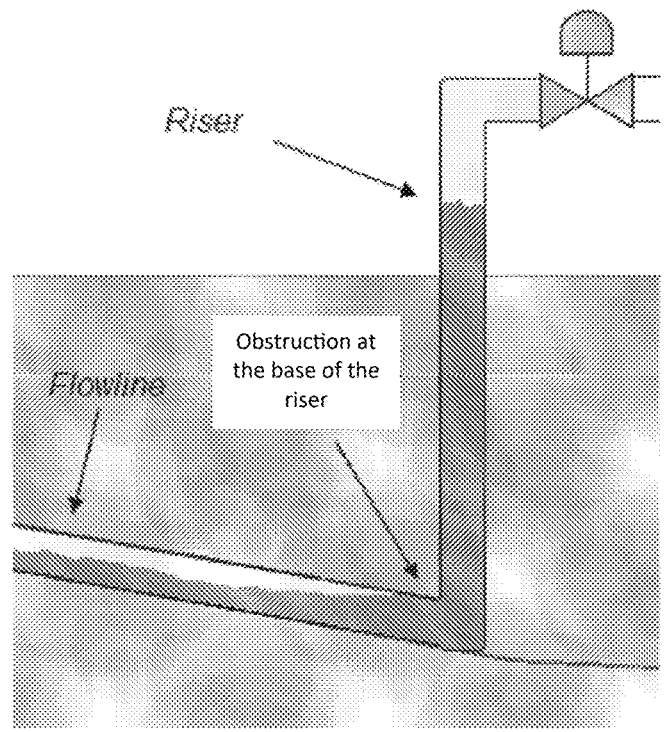
FIG. 1 shows a flowline-riser system in the process of slug formation.
Figure 2:
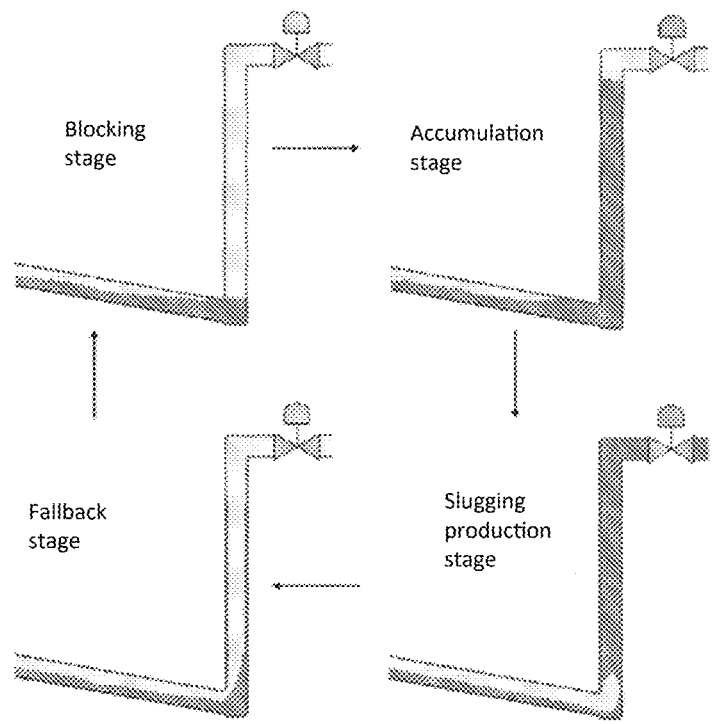
FIG. 2 shows the cyclical process of formation of slugs in risers.
Figure 3:
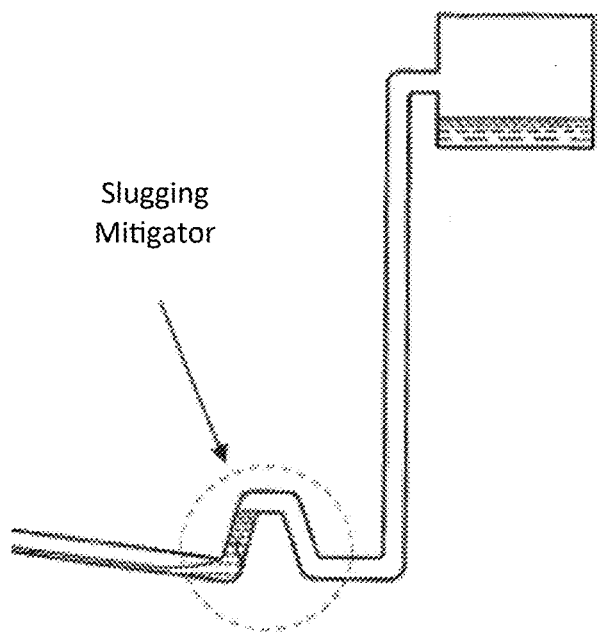
FIG. 3 shows a slug-attenuating device.
Figure 4:
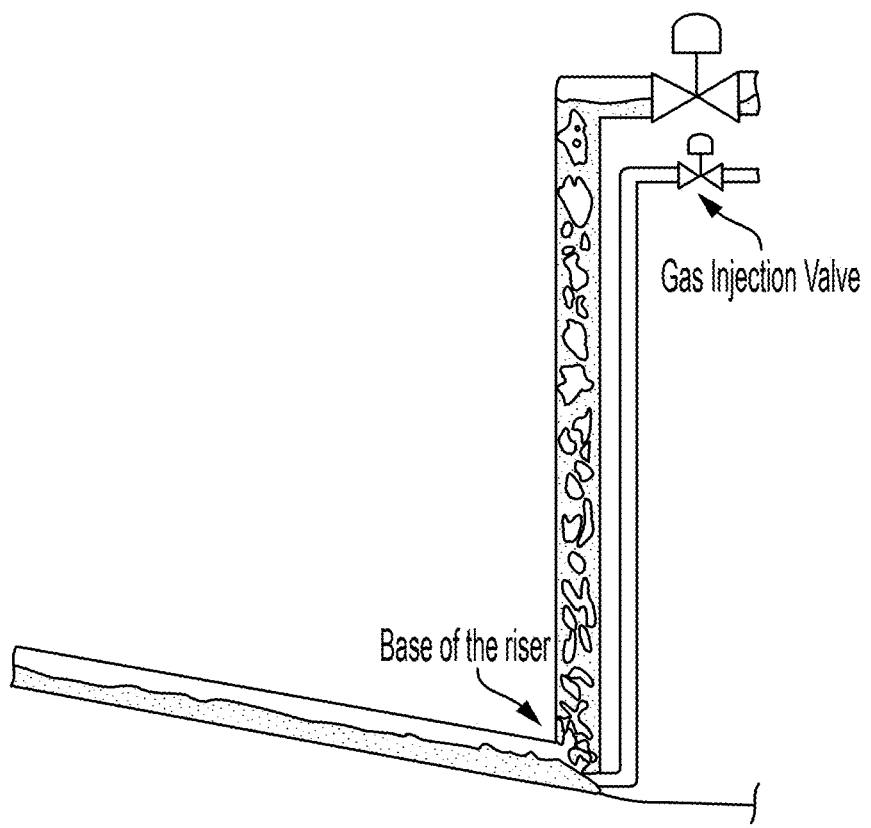
FIG. 4 shows a flowline-riser system with gas injection at the base of the riser.
Figure 5:
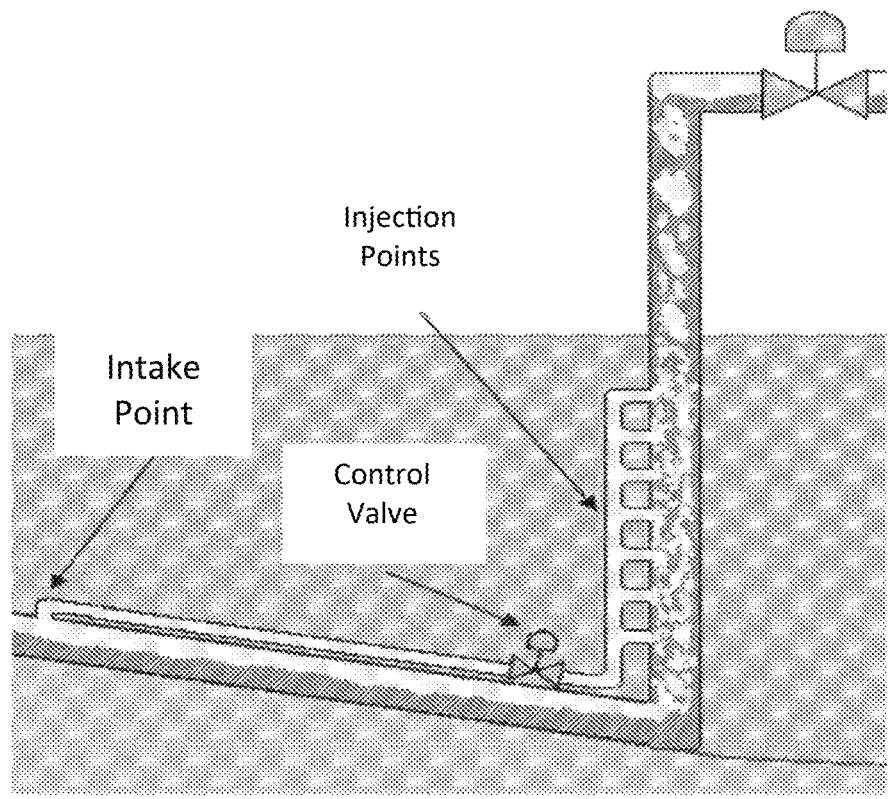
FIG. 5 shows a flowline-riser system with gas reinjection.
Figure 6:
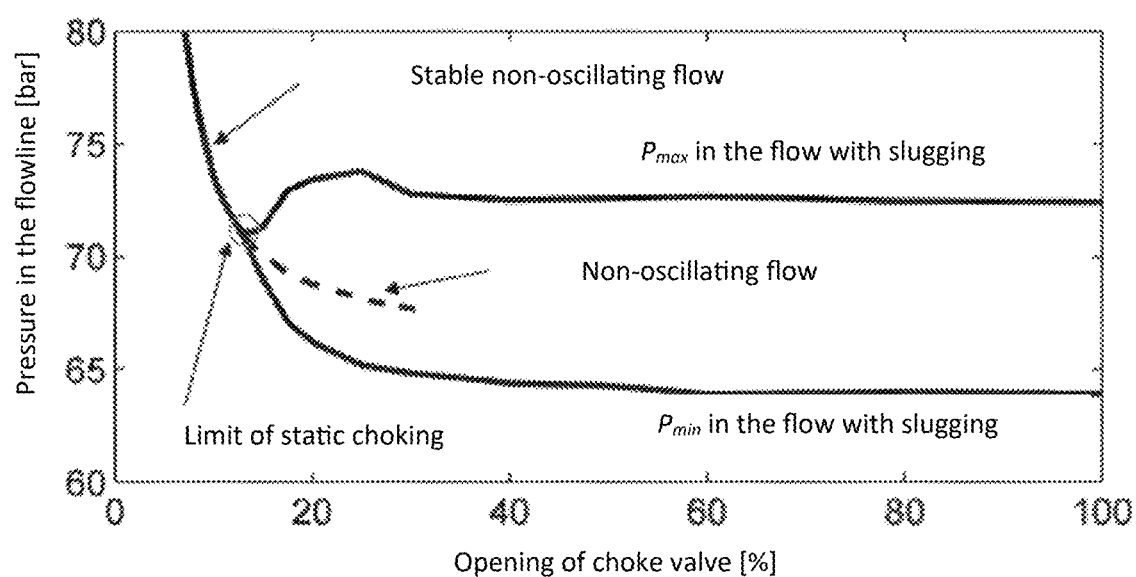
FIG. 6 contains a Hopf bifurcation diagram for a flowline-riser system.
Figure 7:
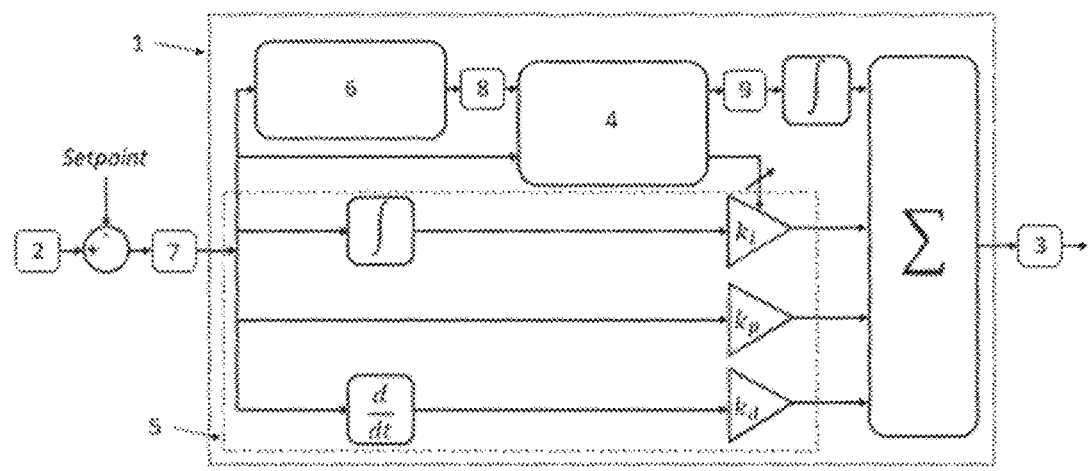
FIG. 7 shows the architecture of the slug-suppressing controller.

The invention is a controller for a slug suppressor (1) whose input is a variable from a system that is sensitive to slugging (2) and the output is a control action (3) that commands the opening of the choke valve. The algorithm used in the controller is the result of a hybridization of a fuzzy inference system (FIS) (4) and a classic PID control algorithm (5). A diagram illustrating the architecture of this controller is shown in FIG. 7.

The input variable (2) used in the controller must be sensitive to the passage of severe slugging, that is: the signal measured needs to reproduce the typical oscillations of this type of flow. Different from classic anti-slugging controllers, without compromising the efficacy of the controller, a variable is admitted, which is measured at the surface installation, such as the pressure upstream of the choke valve, which is easily obtained at production facilities.

The input variable (2) is compared to a reference value (setpoint) to determine the control error (7), which in turn is used by the PID parcel (5) of the controller in determining the control action (3) that is applied to the choke valve. To offset the low performance of the PID algorithm (5) when using surface measurements, the controller uses a fuzzy interference system (FIS) (4) to incorporate heuristic knowledge into the controller's action.

In addition to the control error (7), the FIS (4) has an estimated degree of severity of the slugs (8) as an input, which value is calculated by an algorithm that estimates the severity of the slugs (6), which is responsible for translating the intensity of the slugs to which the system is submitted into a numeric value.

While other algorithms are used that estimate the severity of the slugs, the algorithm originally used in the implementation of the invention was based on the estimate of the fundamental frequency of the variable measured (2), as there is a monotonically increasing relationship between the severity of the slugs and the oscillation frequency of the variable measured (2). The advantage of this approach is that the estimated frequencies are independent of the variable observed, and its sensitivity to slugging.

Implementation of the estimated frequency in real time was based on calculating the self-correction of the variable measured, with the periodic exception (every $T_a$ seconds) of the following algorithm:

1. Show the actual value of the variable measured, X(n), adding to it a buffer of size L.
2. Calculate the average of the buffer X(1:L), storing it in $\bar{X}$.
3. Determine the sequence of average zero, $X^0(1:L)$, using the equation:

$$X^0(1:L)=X(1:L)-\bar{X}$$

4. Calculate the variance of $X^0(1:L)$; if it is less than a threshold of $\sigma^2_{min}$, consider the system stable and the algorithm returns frequency zero.
5. Calculate the self-correction of $X^0(1:L)$, storing it in $X_x(1:L)$.
6. Determine the index i of the element pertaining to $X_x(1:L)$, which has the greatest value after the first cross through zero.
7. Calculate the period of oscillation using the following equation:

$$T_g=T_a(i-1)$$

8. The value of the frequency is returned in mHz, calculated as $1000/T_g$.

For this algorithm to be used successfully, it is important that a sample time, $T_a$, be defined that is sufficiently small to sample at least 10 samples from the fastest slugging cycle in the system. Furthermore, the buffer size, L, must be capable of completely storing at least two slugging cycles.

Figure 8:
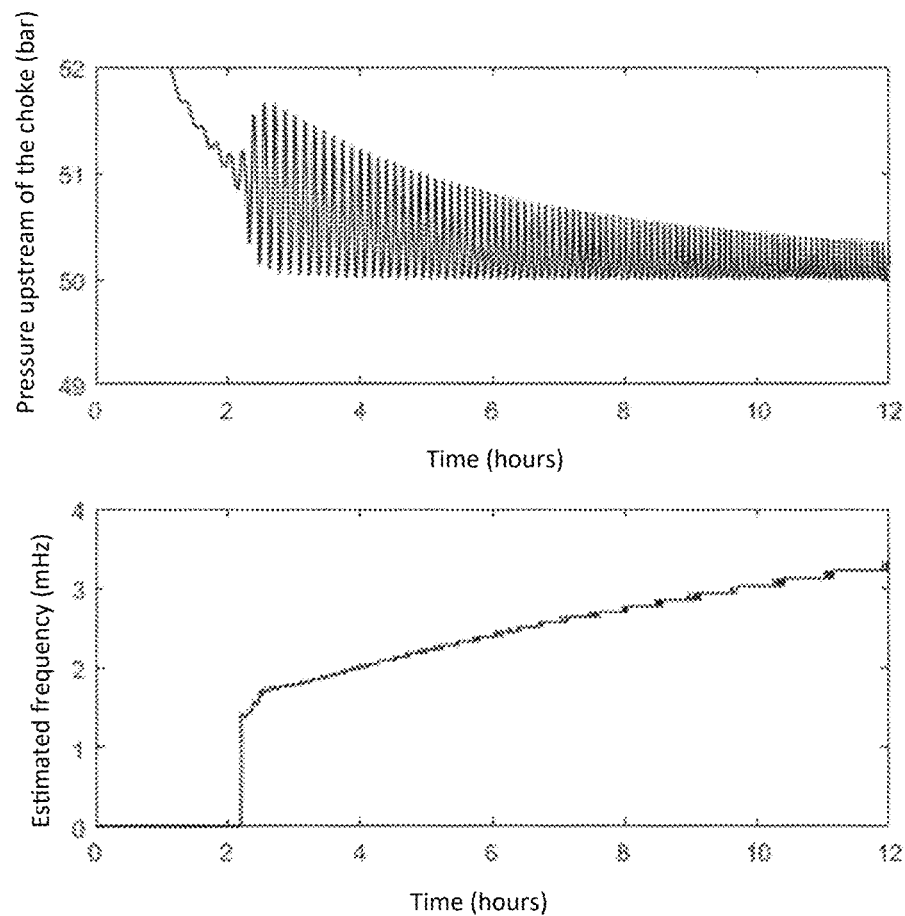
FIG. 8 shows the result of the verification test of the self-correction algorithm for estimating frequency.

The efficacy of the described algorithm was verified through a test in which the severity of the slugs at a simulated plant was increased gradually by means of opening the choke valve from 0 to 100% over 12 hours. The result of this test is presented in FIG. 8, in which the pressure upstream of the choke and the estimated frequency throughout the simulation are shown. In this graph, it can be seen that the estimated frequency grows as the severity of the slugging increases, which justifies the use of the oscillation frequency as the degree of severity of the slugging (8).

Figure 9:
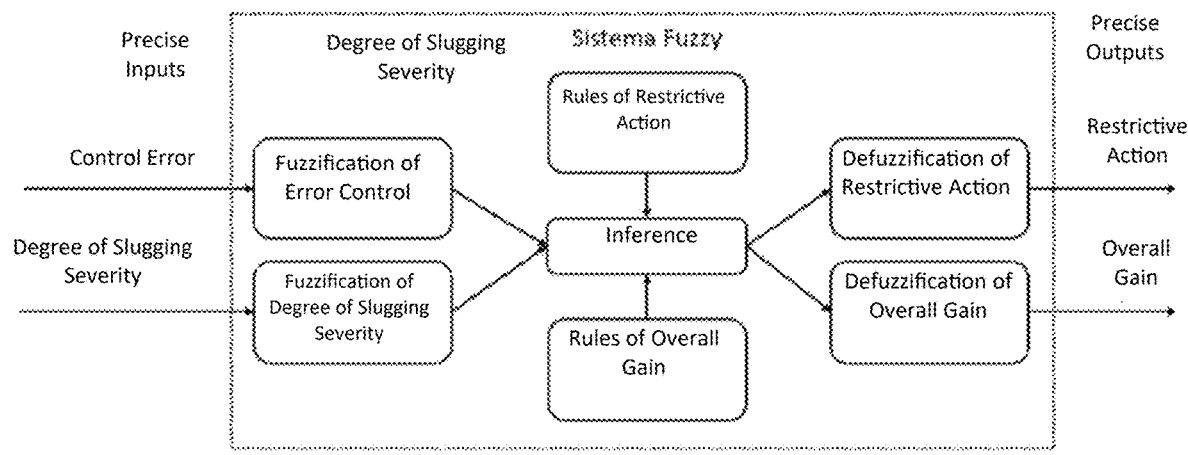
FIG. 9 shows the diagram of the fuzzy interference system used in the slug-suppressing controller.

With both input variables, control error (7), and degree of severity of the slugs (8) determined, the FIS (4) performs two heuristic interventions in the controller: manipulation of the overall gain, $k_i$, of the PID algorithm (5), and close of the choke valve in a specific way if the well is slugging. The name "restrictive action" (9) was given to this second action, which is added to the actions of the PID controller after an integration, because it acts by restricting the choke valve. An internal architectural diagram of the FIS (4) is presented in FIG. 9.

As usual, the rules of inference used in the FIS (4) were defined based on the human knowledge acquired through operation of these systems. In the case of the "restrictive action" output (9), the following rules of inference were used:

1. If the system is not slugging, then the restrictive action (9) is unnecessary.
2. If the system is slugging and the control error (7) is very negative, then the restrictive action (9) is necessary.
3. If the system is slugging and the control error (7) is negative, then the restrictive action (9) is necessary.
4. If the system is slugging and the control error (7) is zero, then the restrictive action (9) is necessary.
5. If the system is slugging and the control error (7) is positive, then the restrictive action (9) is not necessary.
6. If the system is slugging and the control error (7) is very positive, then the restrictive action (9) is not necessary.

The first rule arises from the fact that the FIS (4) helps stabilize the system by gradually closing the choke only during the occurrence of slugging, and restrictive action (9) is not necessary when the flow is stabilized.

The other rules define the following behavior: during the occurrence of the slugging cycle, the FIS (4) will tend to close the choke valve only when the control error is negative and it will not take action when the error is positive, since in this stage of the slugging cycle a tendency to self-regulation was seen. That heuristic closure is one of the biggest differentials of this controller.

The PID parcel (5) of the controller will also tend to close the choke valve when the control error is negative, but it will tend to open it when the error is positive, which, depending on the characteristics of the slugging, may even aggravate the instability of the system. Thus it is necessary to reduce the actuation capacity of the PID controller (5) during the occurrence of slugging. This is done by manipulating the overall gain, $k_i$, of the PID (5) by the FIS (4). The linguistic rules that define that manipulation for the gain $k_i$ are:

1. If the system is slugging, then the overall gain is low.
2. If the system is not slugging and the control error (7) is very negative, then the overall gain is high.
3. If the system is not slugging and the control error (7) is negative, then the overall gain is high.
4. If the system is not slugging and the control error (7) is zero, then the overall gain is low.
5. If the system is not slugging and the control error (7) is positive, then the overall gain is average.
6. If the system is not slugging and the control error (7) is very positive, then the overall gain is high.

Analysis of these rules shows that in addition to reducing the overall gain during the occurrence of slugging, the FIS action (4) improves the capacity of the PID algorithm (5) in rejecting disturbances due to the use of a non-linear overall gain, which increases with the error. The asymmetry between rules 3 and 5 arises from the fact that the controller may be more aggressive in closing the choke valve, as it is a stabilizing intervention.

With the objective of making implementation of the FIS (4) simpler, use of triangular and trapezoidal functions in defining the terms of the linguistic input variables and singleton functions in the terms of the output linguistic variables is recommended.

Figure 10:
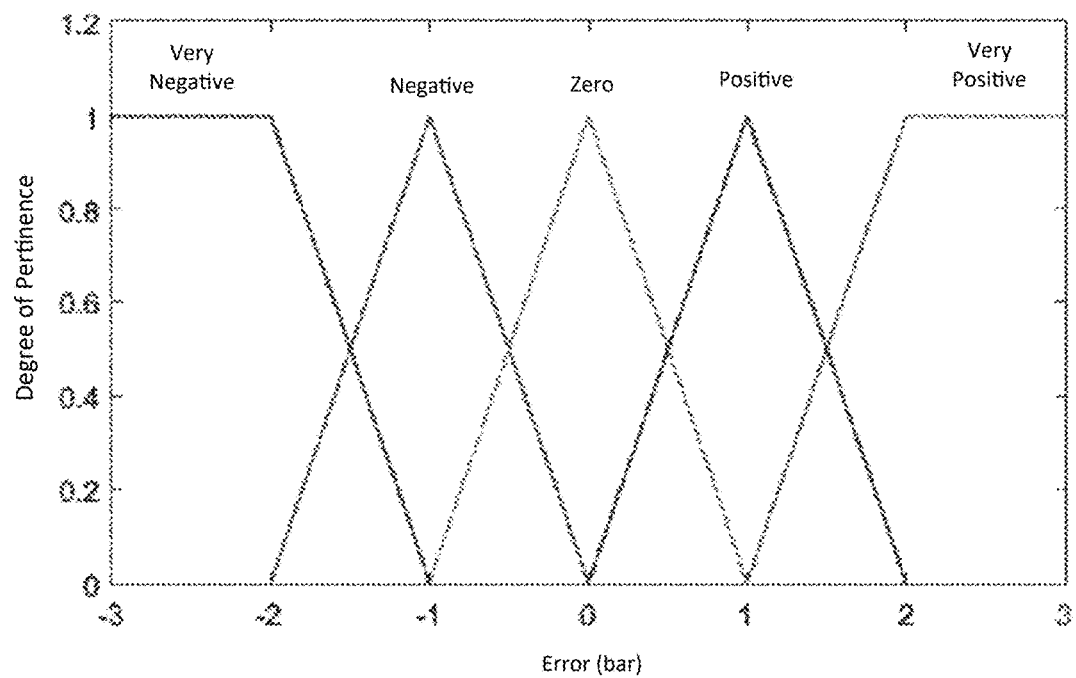
FIG. 10 shows functions pertaining to the linguistic variable "Control Error"
Figure 11:
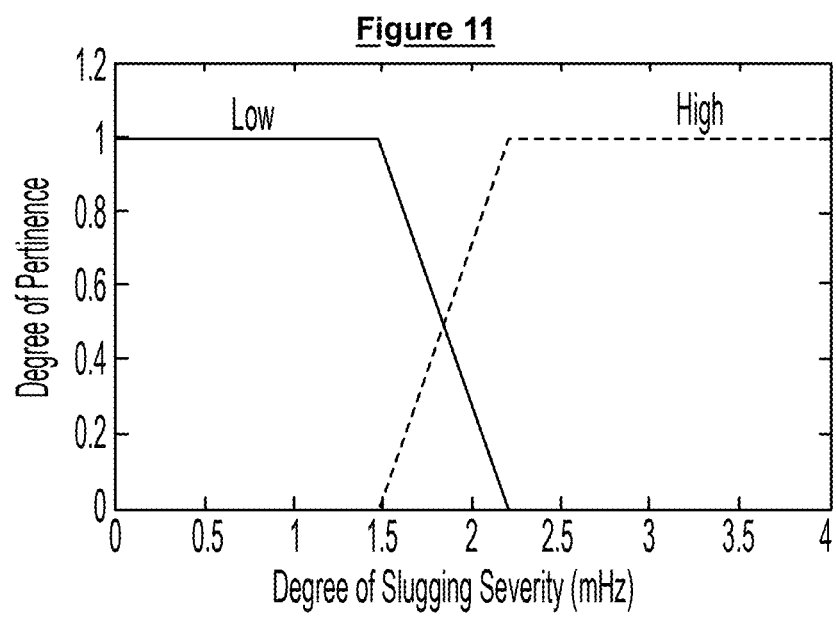
FIG. 11 shows functions pertaining to the linguistic variable "Degree of Slugging Severity"

In the tests performed to validate the controller, for the "Control Error" (7) input variable, a universe of discourse was considered of −3 bar to 3 bar and five linguistic terms, which may be seen in FIG. 10. For the input variable "Degree of Severity of Slugging" (8), a universe of discourse was considered from 0 to 4 mHz (millihertz) and only two linguistic terms, as shown in FIG. 11. As in the tests performed, the oscillations were begun at a frequency of around 1.5 mHz, the linguistic term "degree of severity of slugging is low" has the same meaning as "system is not slugging," therefore the term "degree of severity of slugging is high" means "system is slugging."

Figure 12:
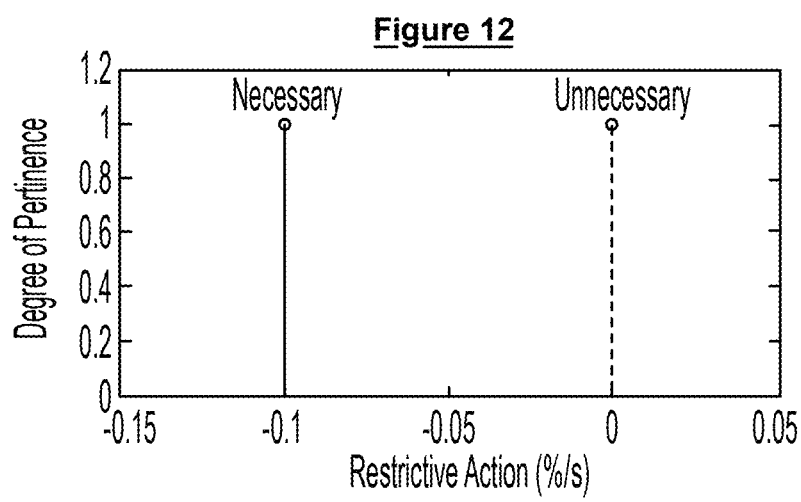
FIG. 12 shows functions pertaining to the linguistic variable "Restrictive Action"

In the same tests, the output linguistic variable "Restrictive Action" (9) was defined from two linguistic terms, as can be seen in FIG. 12. Finally, the output linguistic variable "Overall Gain" was defined by means of three linguistic terms, presented in FIG. 13.

Figure 13:
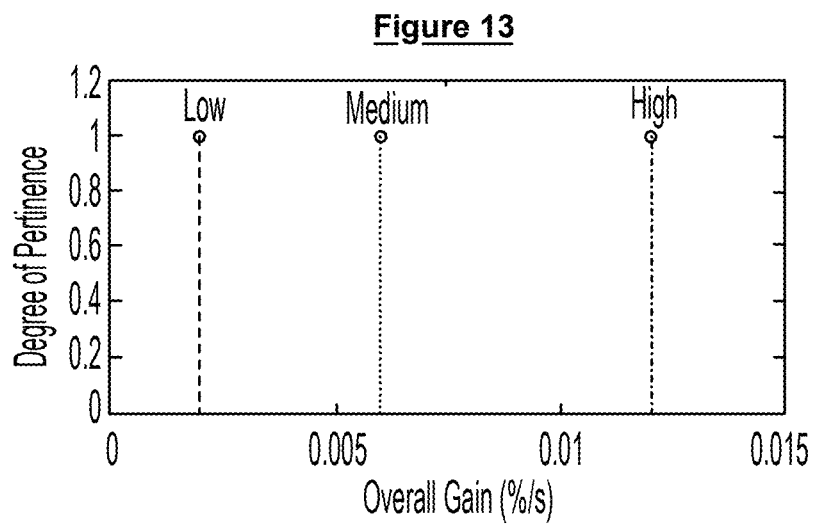
FIG. 13 shows functions pertaining to the linguistic variable "Overall Gain"

Due to the use of singleton functions in the definition of the terms of the output variables, the process of defuzzification (the process of conversion from (imprecise) fuzzy sets into real precise values) degenerates into a simple weighted average of the support values for the singleton groups (they are the fuzzy groups in which a function of pertinence is just a point in the universe of discourse), such as in FIGS. 12 and 13), where the weight of each consequent is given by the higher degree of activation between the rules that activate it.

Figure 14:
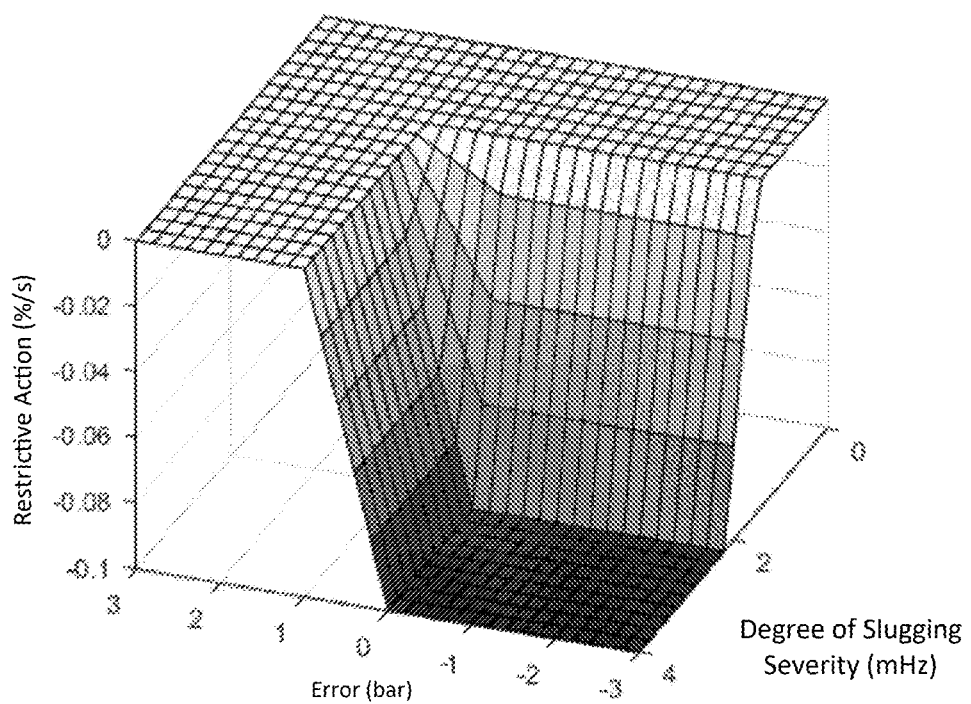
FIG. 14 shows the response surface of the FIS for the output variable "Restrictive Action"
Figure 15:
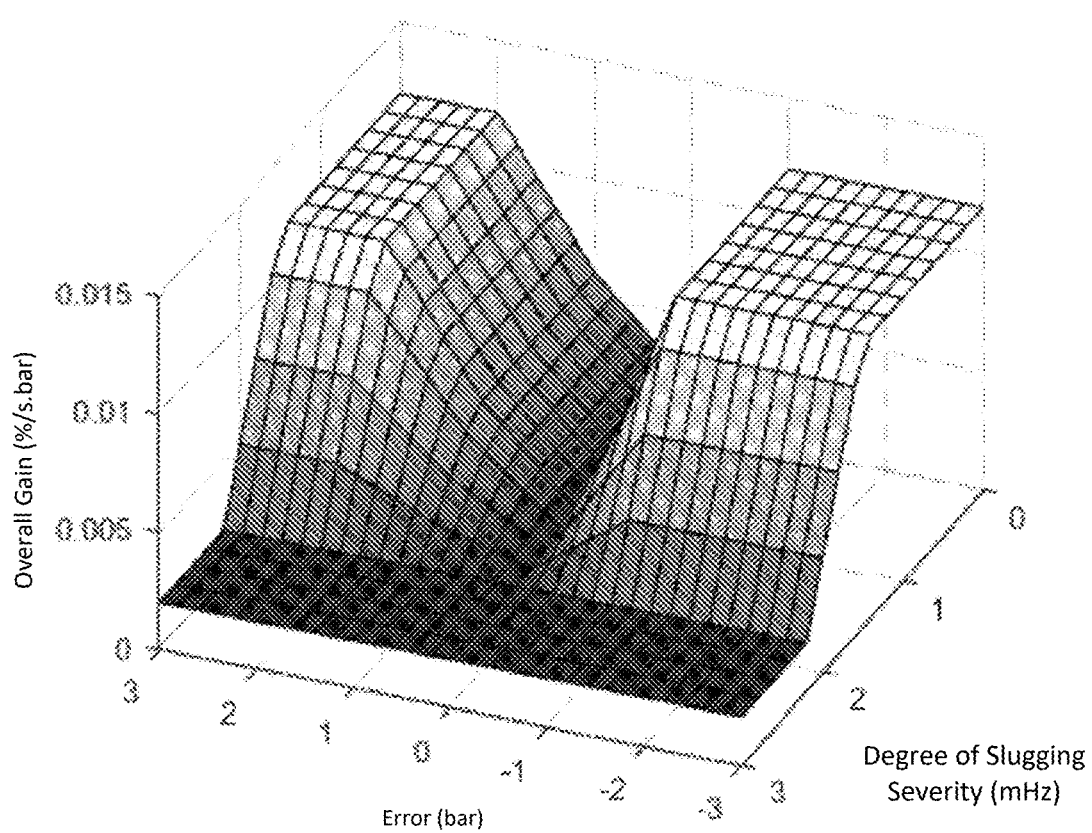
FIG. 15 shows the response surface of the FIS for the output variable "Overall Gain"

In FIG. 14 and FIG. 15, the response surfaces of the output variables from the FIS (4) described in this section are shown. These figures show that the system developed presents the desired behavior, which was described linguistically in the rules of FIS activation (4).

The proportional gain, $K_p$, and the derivative gain, $K_d$, of the PID algorithm (5) were constant and equal to 0.5%/bar for $K_p$ and 1200 s. %/bar for $K_d$ during all tests performed.

Performance Tests

With the objective of verifying the performance of the controller described in this document in various operating scenarios, several computer tests were run using a mathematic model of an offshore production system.

In these tests, the invented controller is called an "FPID-$P_2$," in reference to its hybrid fuzzy PID architecture, and to the use of pressure upstream of the choke valve ($P_2$) as a measured variable. The results obtained were compared to classic PID controllers that use the pressure upstream of the choke valve ($P_2$) as the controlled variable, and the pressure at the base of the riser ($P_1$), called PID-$P_2$ and PID-P1, respectively.

Suppression of Slugging

With the objective of verifying the invention's capacity to suppress slugging, a test was performed in which the initial opening of the choke valve is fixed at 40%, in which region the flow is characterized by the occurrence of severe slugging. After 2000 seconds of simulation, the loop is closed through the controller being evaluated, which acts on the system until the end of the test, at 5000 seconds.

Figure 16:
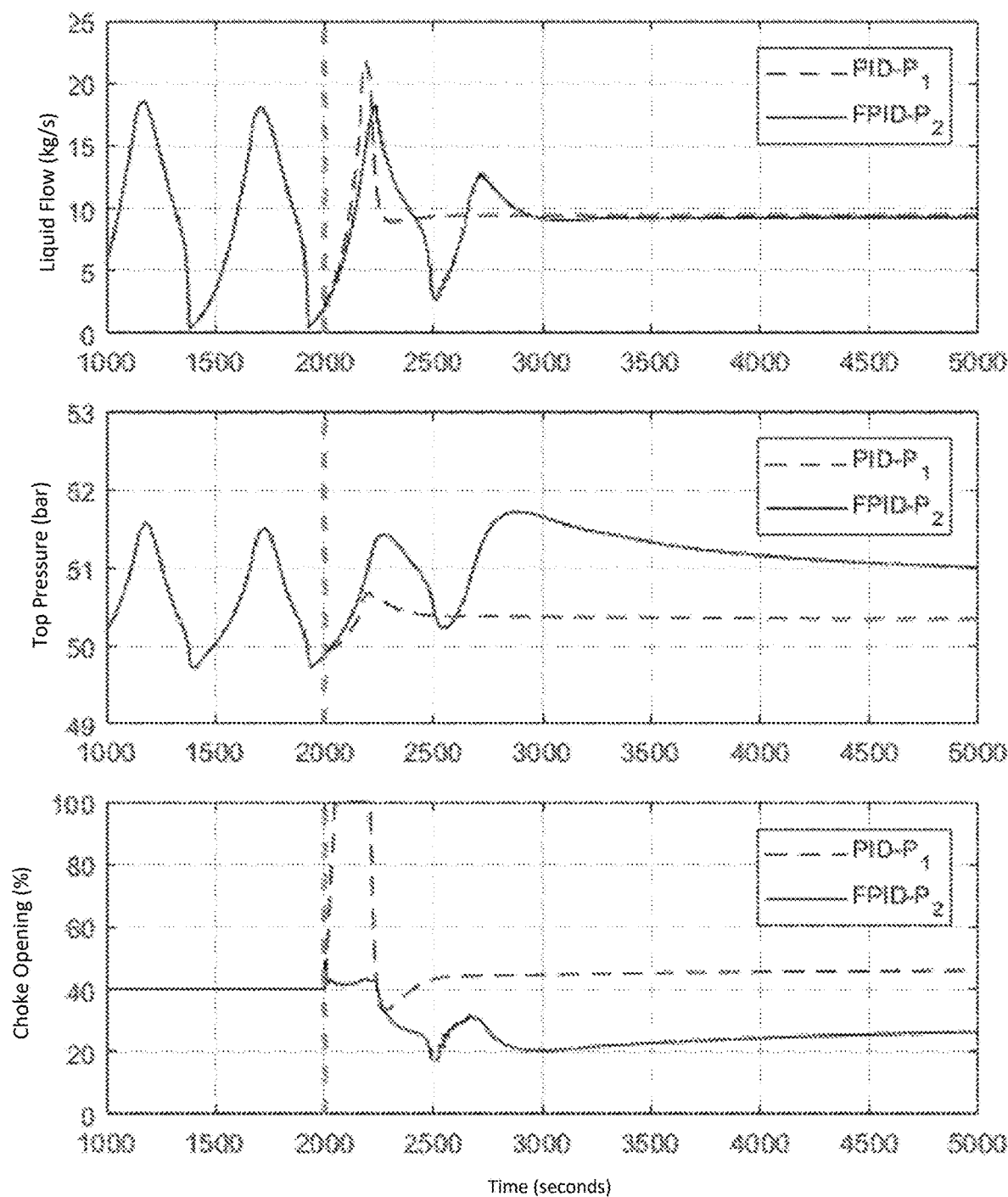
FIG. 16 shows the responses of the most relevant variables from the suppression capacity test with initial opening of the choke at 40%.

The results for FPID-$P_2$ and PID-$P_1$ controllers are shown in FIG. 16, indicating the responses of the flow of liquid produced, the pressure upstream of the choke, and the opening of the choke valve.

It is seen that the FPID-$P_2$ controller was successful in the task of stabilizing the flow from the system. However, when compared to the PID-$P_1$ controller, a significantly slower control action (3) is noted in the FPID-$P_2$ controller, which leads to the need for more time for complete suppression of slugging. That greater delay in suppression is due to less sensitivity of the variable seen by the FPID-$P_2$.

Figure 17:
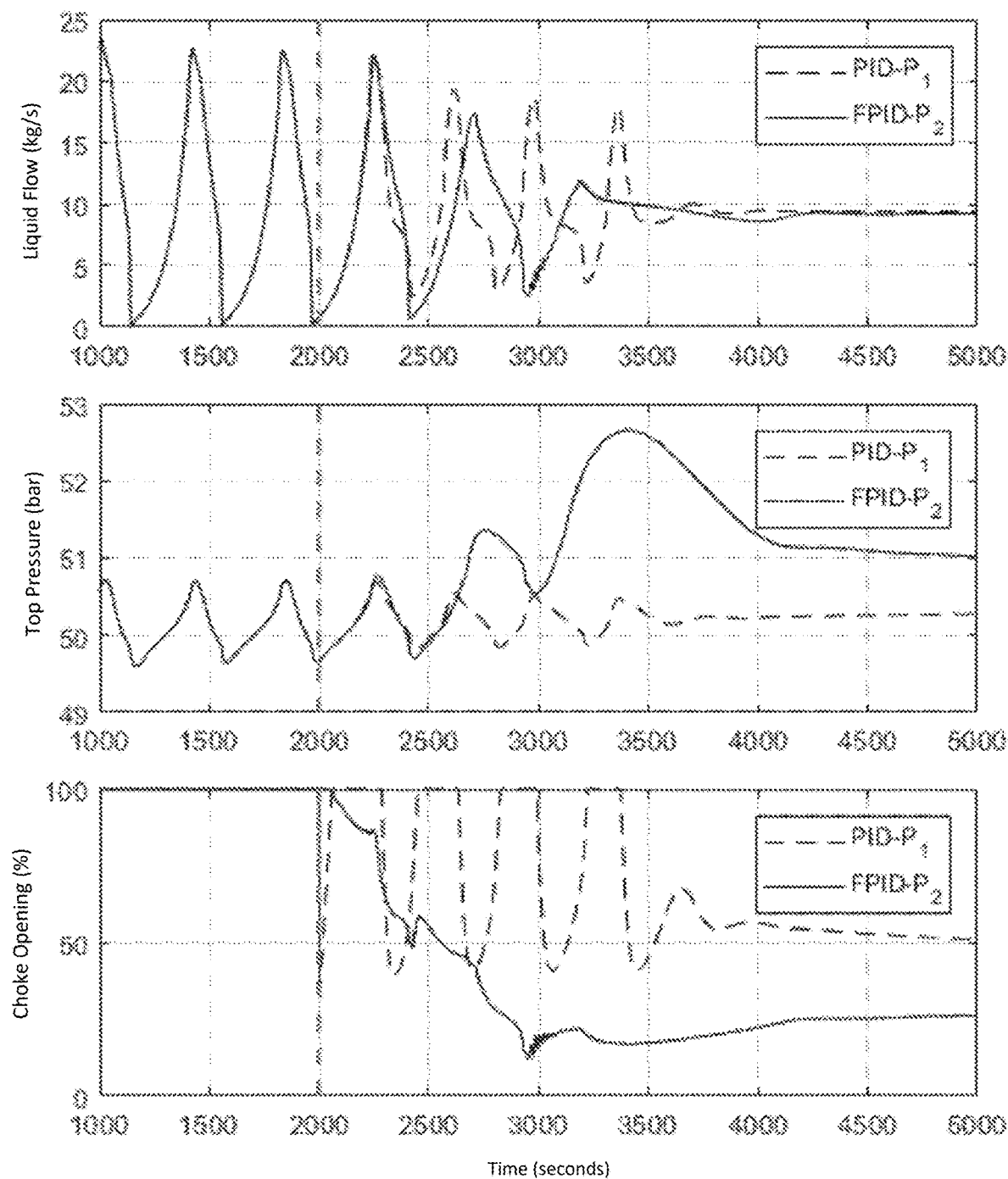
FIG. 17 shows the responses of the most relevant variables from the suppression capacity test with initial opening of the choke at 100%.

With the objective of verifying whether these results repeat in other conditions, the test was repeated for a more severe situation, with an initial opening of the choke valve at 100%. The result of this second test is shown in FIG. 17.

As can be seen in the graph of this second test, the FPID-$P_2$ controller was able to suppress the slugging more quickly than the reference controller, even with a significantly slower control action (3). This better performance is a consequence of the restrictive action (9) of the FPID-$P_2$ controller, which closes the choke valve through a specific heuristic that is optimized for this type of problem. FIG. 17 shows that although the linear PID-$P_1$ controller observes a better-quality variable ($P_1$), it loses performance when the choke valve is opened in the positive pressure cycles, which characteristic is inherent to linear controllers.

Seeking to investigate the importance of the heuristic action implemented by the FIS (4) of the FPID-$P_2$ controller, the same tests were repeated for the PID-$P_2$ controller, which uses a classic PID algorithm and the pressure at the top of the riser as the controlled variable. The gains used in this controller were the same as those used in the PID parcel (3) of the FPID-$P_2$ controller, with $k_i$ fixed at 0.01%/s·bar. The results are shown in Table 1, where the symbol '-' represents tests in which the PID-$P_2$ controller was unable to stabilize the flow.

TABLE 1

Time necessary for suppression of slugging (FPID-$P_2$ and PID-$P_2$).

| Choke opening | FPID-P2 | PID-P2 |
|---|---|---|
| 20% | 280s | 285s |
| 40% | 830s | — |
| 60% | 910s | — |
| 80% | 930s | — |
| 100% | 1270s | — |

Analysis of Table 1 shows the crucial importance of heuristic action of the FPID-$P_2$ controller, since a "pure" PID controller that also only observes the pressure at the top of the riser was only capable of suppressing slugging that was low in severity, which occurs very close to the opening at which the process is found to be in static stability (18%). In all other tests, the pure PID that observes the same surface variable as the FPID-$P_2$, was incapable of suppressing the slugging present in the system.

Figure 18:
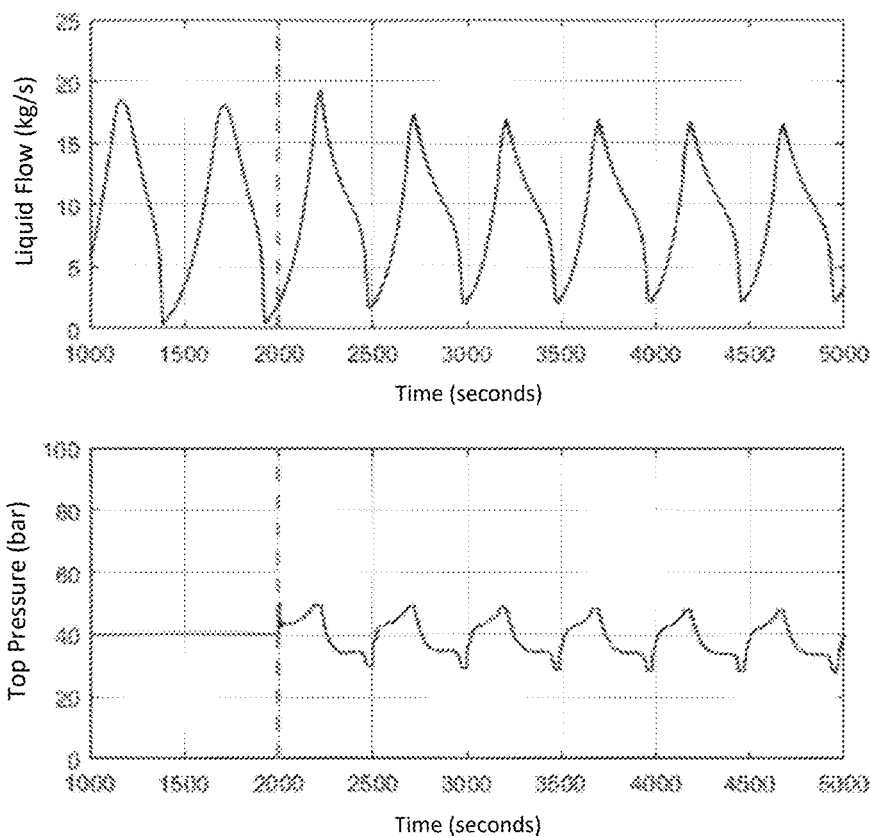
FIG. 18 shows the outflow and valve-opening responses in the test with the PID controller based on the pressure at the top of the riser and prior opening of 40%.

FIG. 18 shows the flow of produced liquid and the control action of the PID-$P_2$ controller throughout the test in which the opening of the choke was initialized at 40%. As discussed previously, the graphs show the complete inability of the controller to stabilize the flow.

Limit of Choke Actuation Speed

In the tests presented above, it was noted that the PID-$P_1$ controller, based on subsea pressure, has a significantly faster control response than that of the FPID-$P_2$ controller. For example, in the test presented in FIG. 17, the PID-$P_1$ controller closes the choke valve from 100% to 40% in just 40 seconds. This action, which has an average speed of 1.5%/s, reaches instantaneous speeds of up to 3.26%/s at the start of the close.

Because of their large sizes, actuation of choke valves is usually slow, with complete closure or opening taking up to three minutes. This is a fundamental limitation to the use of anti-slugging controllers based on linear algorithms.

Figure 19:
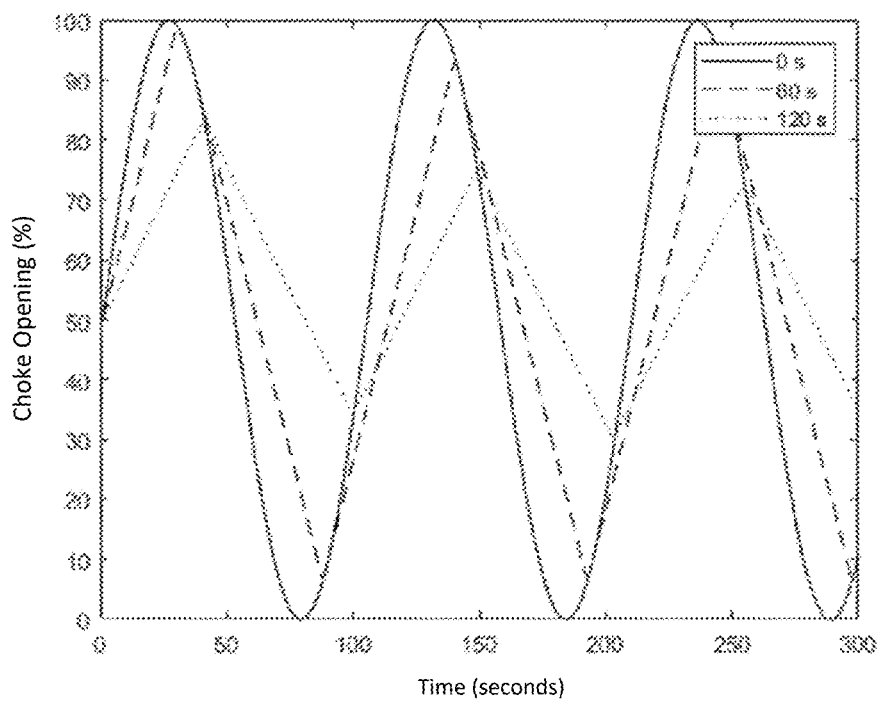
FIG. 19 shows the influence of the limitation on actuation speed of the choke to the rapid controller signals.

The consequence of the slowness on choke valve actuation in the control signal effectively delivered to the plant can be seen in FIG. 19, which shows the real openings of the valve when a sinusoidal control signal with maximum speed of 3%/s is applied to them. Three valves are included, one with instantaneous action, one that needs 60 seconds to perform a complete transition, and one that needs 120 seconds for a complete transition. The deformations presented in FIG. 19 show the reason that slow choke valves pose a huge challenge for use of anti-slugging controllers.

It is reasonable to assume that the invented controller is less sensitive to limitations in actuation speeds as it is a slower controller. With the objective of verifying this hypothesis, the tests performed in the previous section were repeated considering the choke valves that make a complete transition in 60, 90, 120 and 180 seconds. The times necessary to suppress the slugging by the FPID-$P_2$ controller and the PID-$P_1$ controller in each test are presented in Table 2.

TABLE 2

Time necessary for suppression of slugging for different speeds of choke valve actuation (FPID-$P_2$ and PID-$P_1$)

| Opening of the Choke | Complete Transition Time of the Choke Valve | | | | | | | |
|---|---|---|---|---|---|---|---|---|
| | 60s | | 90s | | 120s | | 180s | |
| | FPID-$P_2$ | PID-$P_1$ | FPID-$P_2$ | PID-$P_1$ | FPID-$P_2$ | PID-$P_1$ | FPID-$P_2$ | PID-$P_1$ |
| 20% | 280s | 36s | 280s | 46s | 280s | 78s | 270s | 114s |
| 40% | 830s | 292s | 830s | 1687s | 830s | — | 830s | — |
| 60% | 911s | 344s | 910s | — | 910s | — | 910s | — |
| 80% | 930s | 674s | 930s | — | 930s | — | 930s | — |
| 100% | 1270s | 1364s | 1260s | — | 1260s | — | 1261s | — |

Analysis of Table 2 confirms the hypothesis that the FPID-$P_2$ controller is not very sensitive to the limitation on the actuation speed of the choke valve. In truth, there was no loss of controller performance at all, as it was able to suppress the slugging in nearly the same interval of time in all tests. On the other hand, the effect of limiting actuation speed was catastrophic for the PID-$P_1$ controller, with loss of suppression capacity in most of the tests in which the choke valves take 90 seconds or more to make a complete transition.

Figure 20:
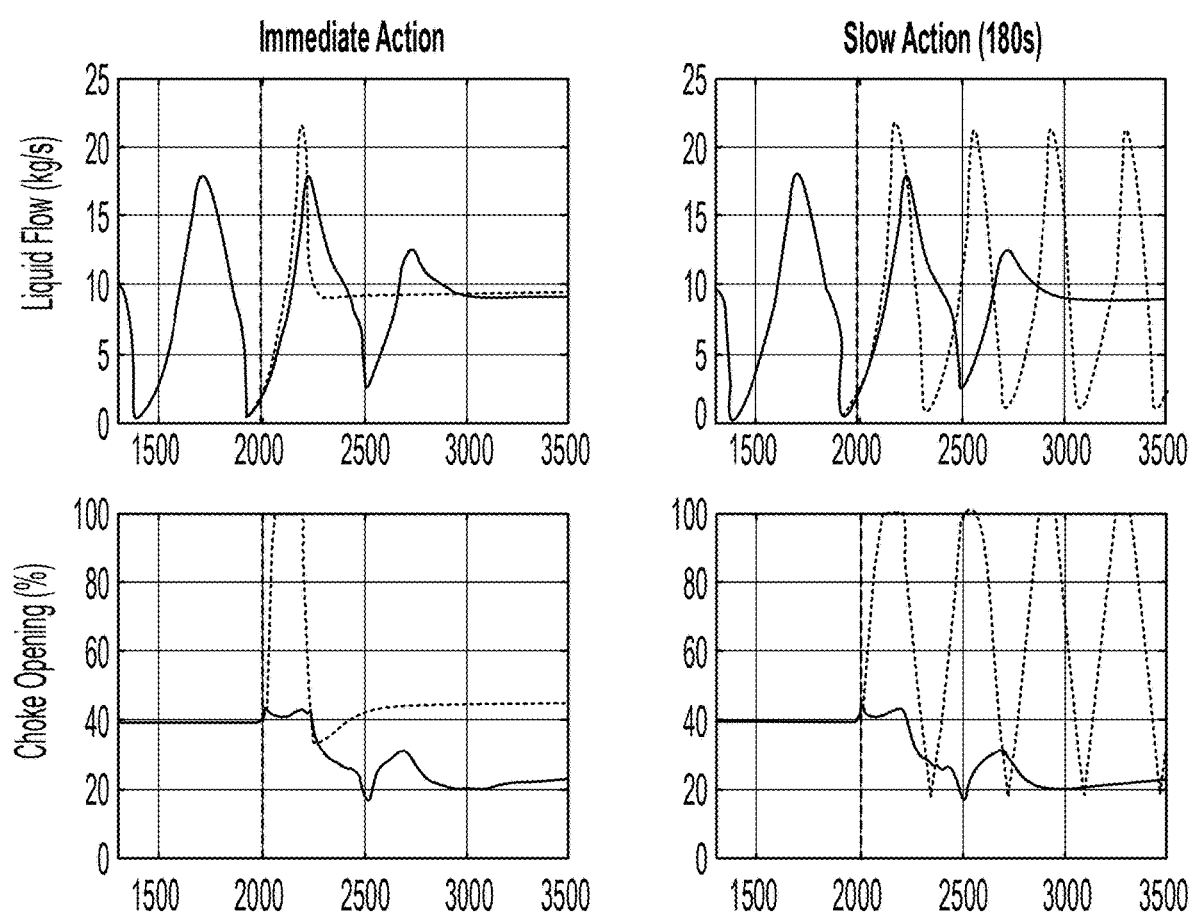
FIG. 20 shows the outflow and valve opening for the tests in which the actuation is instantaneous (to the left) and slow (to the right). Dotted curves are for the FPID-$P_2$ controller and continuous of the PID-$P_1$.

FIG. 20 shows the responses of liquid outflow and opening of the choke valve for two tests in which the choke valve is initiated at 40% opening, with an instantaneous actuation of the valve and another with slow actuation, in which 180 seconds are necessary for a complete transition to occur. Analysis of the graphs shows that the FPID-$P_2$ controller was practically immune to the slowness of the choke valve. The only observable difference occurs right after 2500 seconds, when a slight alleviation of the control action is seen in the test in which the choke valve is slow. On the other hand, the action of the PID-$P_1$ controller was completely disfigured, resulting in an operation contrary to what was expected, with intensification of the severity of the slugging after activation of the controller.

This test shows that although the FPID-$P_2$ controller observes a variability with low sensitivity and non-minimum phase, the pressure upstream of the choke, its capacity to detect the slugging, and to act heuristically not only offset this deficiency, but in some cases ensure performance that is superior to that of linear controllers that observe controllers more suitable to anti-slugging control.

Stabilization of an Unstable Point of Operation

Verification of the capacity of an anti-slugging controller to stabilize a stable point is quite simple and consists of awaiting stabilization of the flow, and then disconnecting the controller, keeping the choke valve fixed in the last position defined by the algorithm. If the flow remains stable after disconnection, the controller merely automates the static choking; on the other hand, if the system begins to oscillate again, the controller was in fact stabilizing an unstable point of operation.

Figure 21:
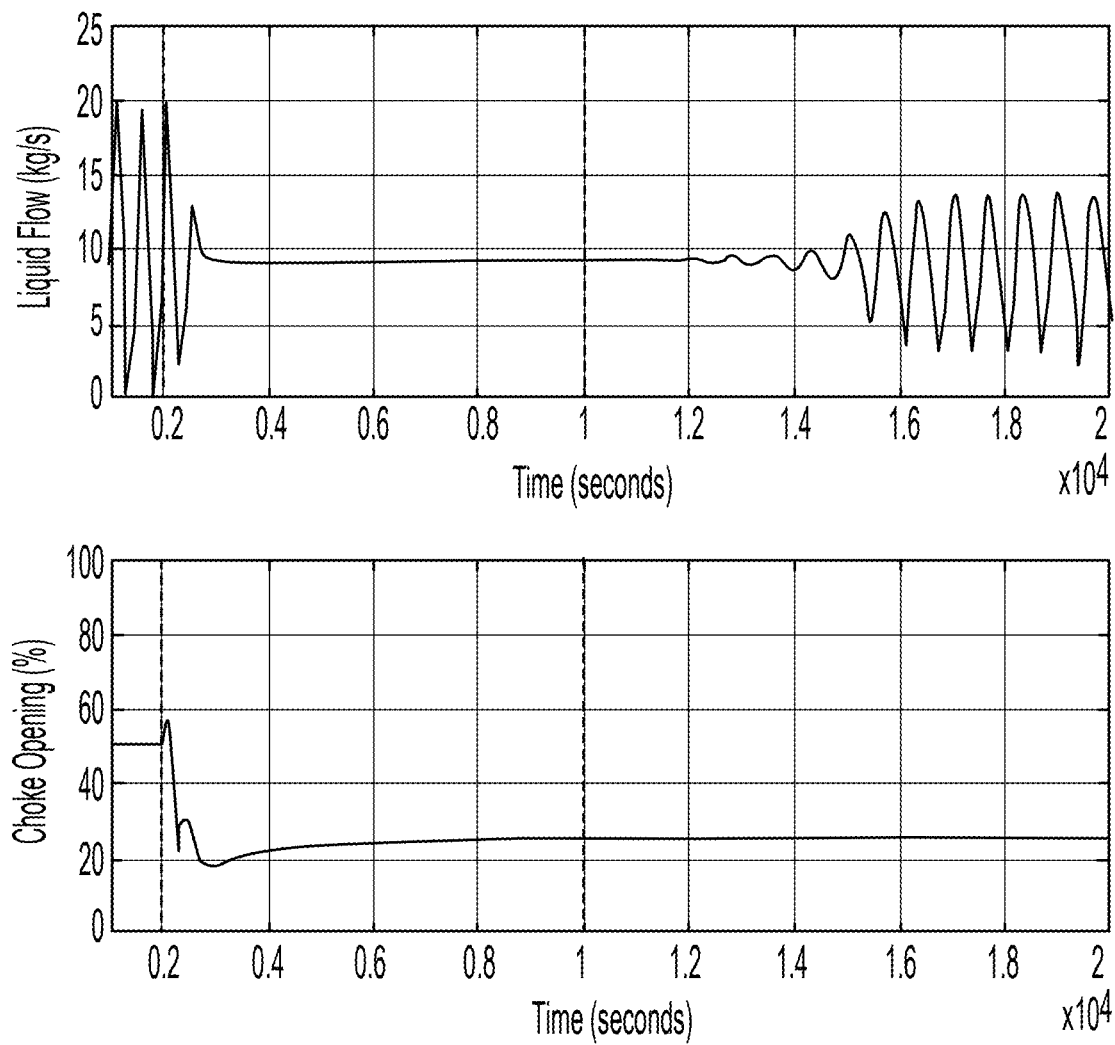
FIG. 21 shows the responses of the outflow and valve opening in the stabilization test at the unstable point.

In order to verify the stabilization capacity of the FPID-$P_2$ controller, a test was performed in which the choke valve was initialized at 50% of opening, with the controller being turned on at 2000 and turned off at 10,000 seconds. The results of this test are shown in FIG. 21.

The results show that after disconnecting the controller at 10,000 seconds, the system again presented oscillations, even without the introduction of any disturbance. It can therefore be concluded that the invention's controller is in the class of controllers that in fact stabilize unstable points of operation, and therefore allow gains in oil production.

Production Gains

Seeking to establish the limits of production gain provided by the FPID-$P_2$ controller, a test was performed in which the initial setpoint of the controller was adjusted to a high value, corresponding to a 10% opening of the choke valve (statically stable region). In this test, whenever the system goes into a permanent regime, the setpoint is decreased by 0.2 bar. This process continues until a very low setpoint causes the system to enter into unstable operation, marking the close of the test. For each point of stable operation obtained in the test, the liquid output at the exit from the riser and the average opening of the choke valve are determined.

Figure 22:
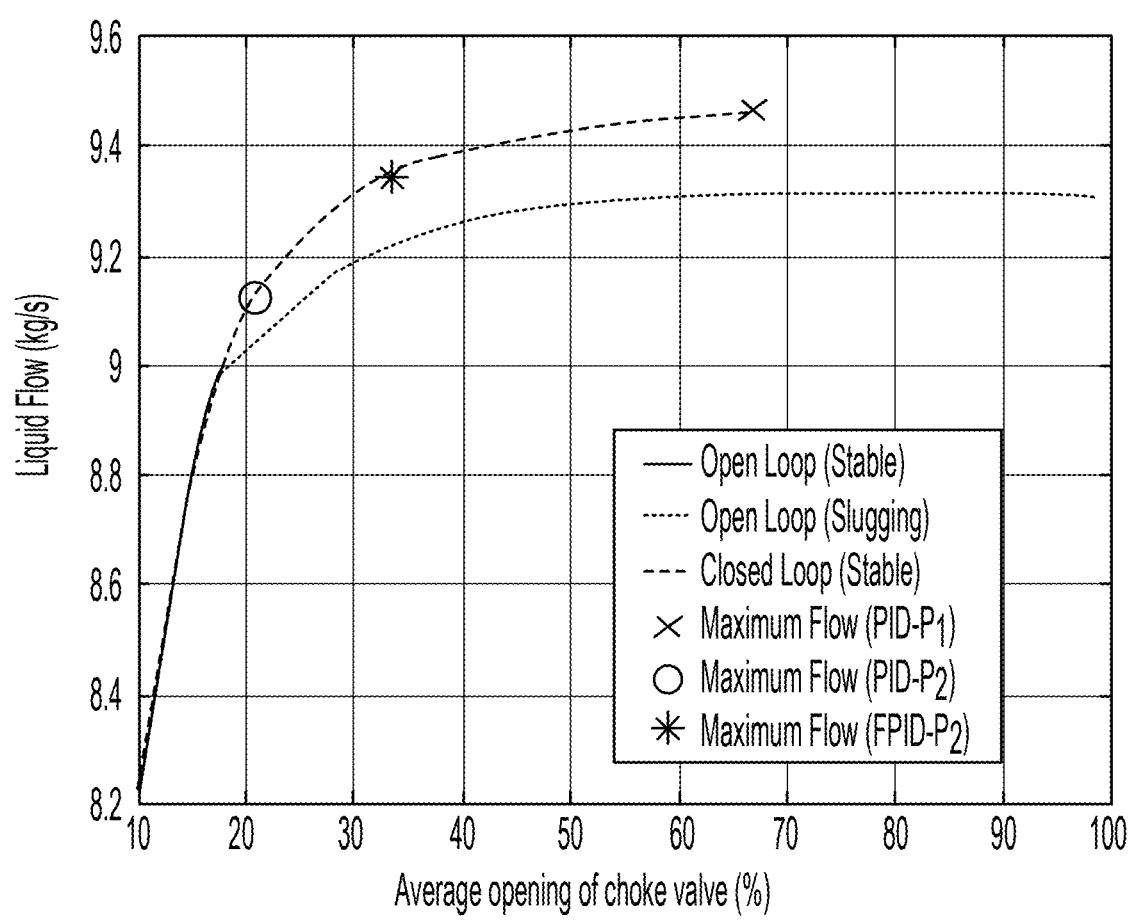
FIG. 22 shows a comparison of the average production obtained by the fuzzy controller, the reference controller, and the open-loop system.

The results obtained in the testing of the FPID-$P_2$, the PID-$P_2$ and PID-$P_1$ controllers are presented in FIG. 22, where the average outflows in the open-loop system are compared, assuming the occurrence of slugging for choke valve openings larger than what is critical (18%). This graph shows that the FPID-$P_2$ controller was able to stabilize the system at average choke valve openings of up to 34%, with corresponding production of 9.35 kg/s, which is a gain of 4.1% of production in relation to the best case of static choking, in which the production is 8.98 kg/s. The FPID-$P_2$ controller also outperformed the PID-$P_2$ controller, which had maximum outflow of 9.13 kg/s. On the other hand, performance of the FPID-$P_2$ controller was less than that of the PID-$P_1$ controller, which was able to stabilize production at a value of 9.46 kg/s, a 5.3% gain over the best case of static choking.

Therefore, the invented controller provides a lower gain in production when compared to the controller that has access to flowline pressure. This disadvantage is a direct consequence of use of a controlled variable with less sensitivity and non-minimum phase in the FPID-$P_2$ controller, because in the absence of slugging, the controller behaves like a PID (3) controller based on this variable, and is therefore subject to the same limitations as linear controllers.

Rejection of Disturbances

In order to verify the behavior of the FPID-$P_2$ controller against typical disturbances in a production system, two more tests were performed.

In the first test, the effect of production with high-frequency (noise) variations on the capacity of the controller (1) to keep the system stable was considered. These variations were modeled using the following equation:

$$W_T = k_p(P_{ra} + P_\alpha + P_l)$$

where:
- $W_T$ is the total outflow from the well. [kg/s]
- $k_p$ is the constant of well productivity [kg/(s·bar)] (Constant)
- $P_{ra}$ is the apparent static pressure in the reservoir. [bar] (Constant)
- $P_\alpha$ is an independent Gaussian stochastic and average null process. [bar]
- $P_l$ is the pressure at the wellhead. [bar]

A value equivalent to 20% of the apparent pressure of the reservoir, $P_{ra}$, used in the model of the producing well, was used as variance of the Gaussian noise. This modeling is equal to a reservoir with fluctuations in its static pressure, which causes fluctuations in the gas and liquid outflows, even with a constant pressure at the wellhead.

Figure 23:
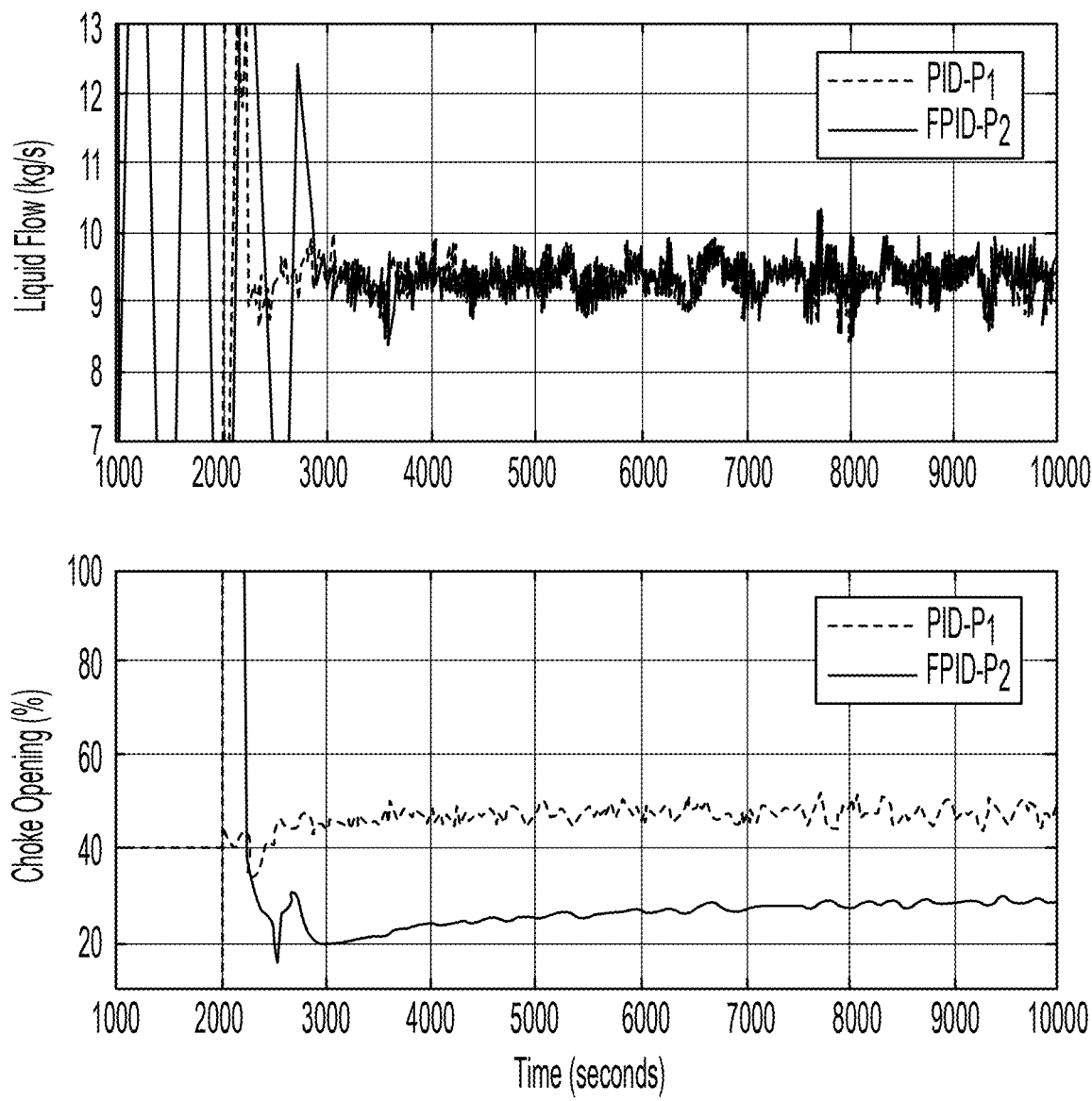
FIG. 23 shows the responses of the outflow and valve opening in the noise production test.

The results of the test for both controllers operating at the setpoint limit are presented in FIG. 23, where it can be seen that both controllers are capable of suppressing slugs and maintaining system stability, even when outflow fluctuations are present. However, maintenance of stability can only be assured with operation at average valve openings that are slightly smaller than those attained in the production scenario without fluctuations.

The smaller valve opening causes the maximum production attained by the FPID-$P_2$ controller to fall from 9.35 kg/x to 9.33 kg/s, and by the PID-$P_1$ controller from 9.46 kg/s to 9.44 kg/s. However, these reductions do not imply greater gains in production, as the stability of the open-loop system was also affected by the fluctuations, becoming stable only for openings smaller than or equal to 16%, which corresponding production is 8.73 kg/s. Thus, the production gains become 6.9% for the FPID-$P_2$ controller, and 8.1% for the PID-$P_1$ controller. The fluctuations, also present in the surface pressures, were not interpreted as slugging by the FPID-$P_2$ controller, thus not triggering the unnecessary use of the restrictive action (9), which would close the choke valve gradually.

In the second test, the types of disturbances considered were degrees, which model some typical disturbances of oil production systems, for example the start of production of another well in systems in which the riser is shared, or even sudden changes in the characteristics of the reservoir or production system.

Figure 24:
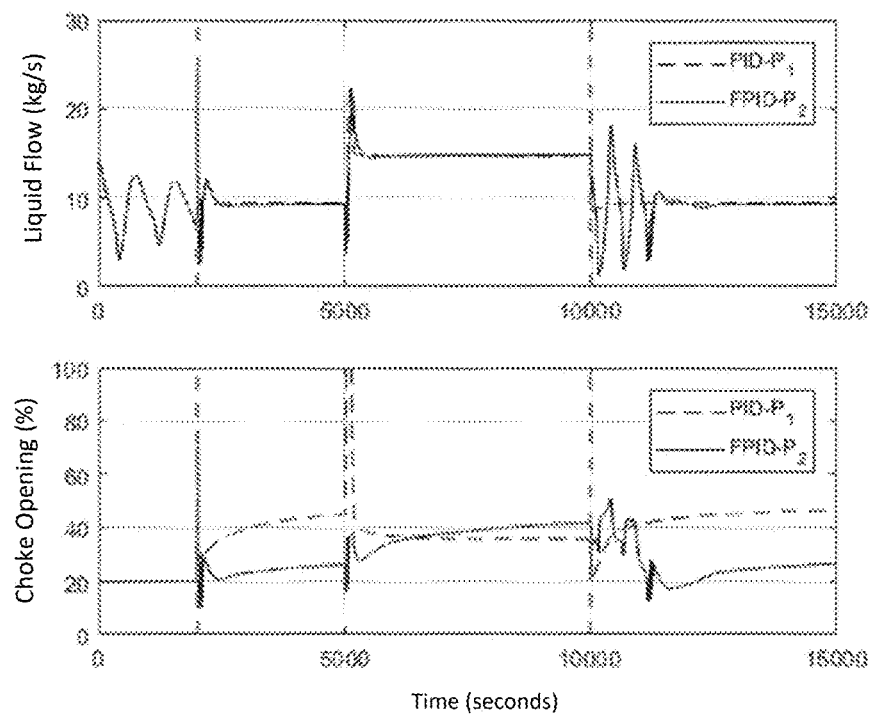
FIG. 24 shows the responses of the outflow and valve opening in the response test to degrees of production (rapid choke)

The system disturbance was the same used in the previous test, with the stochastic process Pa being replaced by a deterministic signal given by an ascending step to 5000 seconds and to a descending step to 1000 seconds. Both steps have amplitude equivalent to 20% of the apparent pressure of the reservoir, $P_{ra}$, used in the model of the producing well. The results are shown in FIG. 24.

An analysis of the graphs shows that although the FPID-$P_2$ controller has had good regulatory performance in the ascending step, which is stabilizing, it was unable to maintain system stability in the descending step, making actuation of the restrictive action necessary (9) to reestablish stability after the occurrence of two slugs. If this heuristic action is not provided by the FIS (4), the system would be unstable indefinitely, because at the moment of the negative step, the opening of the choke was approximately 40%, in which situation a PID controller based on the top pressure is not capable of stabilizing, as can be seen in the test in FIG. 18.

Another interesting observation is that after application of the ascending step, the opening of the choke and production were greater in the test with the FPID-$P_2$ controller, contrary to all of the results obtained up to that moment. Furthermore, in the test with the PID-$P_1$ controller, there was action to close the choke valve after application of the step, causing an unnecessary loss in production, given that increases in the pressure in the reservoir enable stabilization of the system at greater valve openings. This behavior can be explained by greater robustness of the setpoint of the controllers based on the pressure from the top, since this magnitude is less sensitive to disturbances imposed on the production system.

Figure 25:
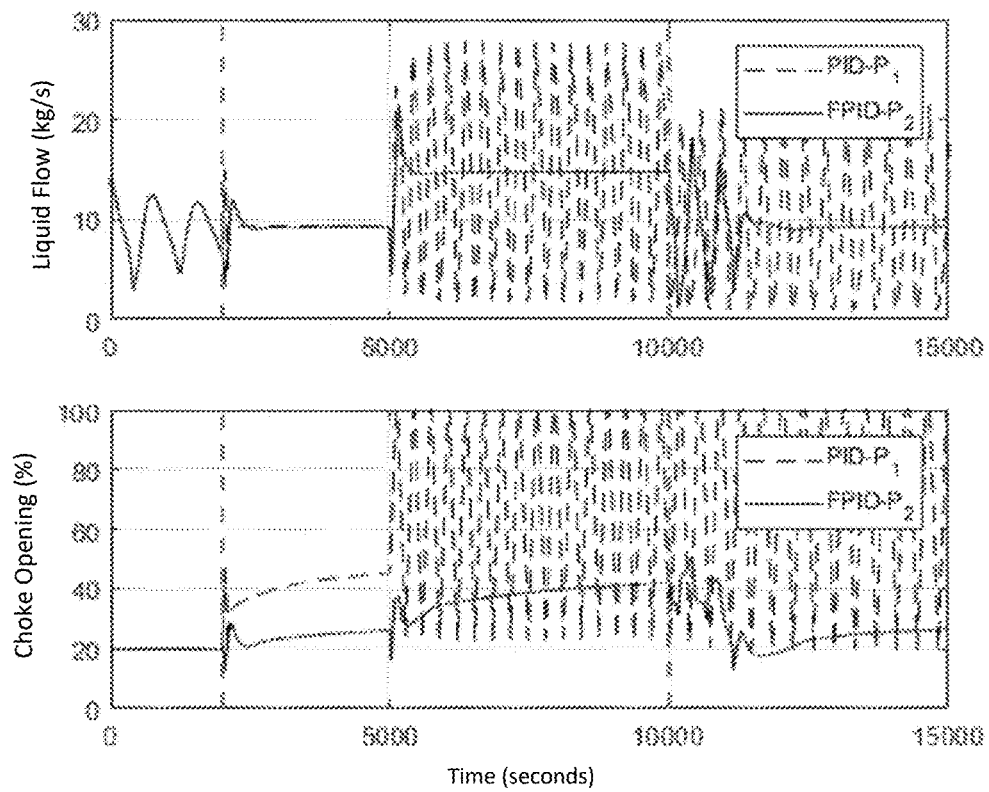
FIG. 25 shows the responses of the outflow and valve opening in the response test to the degrees of production (slow choke)

The last point to observe from this test is that, again, the PID-$P_1$ controller presented an exaggeratedly rapid response, with an almost instantaneous opening of the choke valve at the moment of application of the ascending step. As discussed above, the actuation of these valves is usually slow, making this type of actuation impossible. To verify the effect of the limitation on actuation speed to the regulatory capacity of the system, the tests were repeated with a more realistic choke valve, which causes a complete transition in 180 seconds. The results of this test are shown in FIG. 25.

The realistic consideration of slowness in choke actuation drastically affected the capacity of the PID-$P_1$ controller to regulate the system, because although it was capable of stabilizing the system in the initial situation, in which the choke valve was only 20% open, the stability was indefinitely lost after application of the first step, in an instant in which the choke was 45% open. This result exemplifies the importance of an anti-slugging controller being able to stabilize a system for any initial conditions, and it excludes the idea that a simple manual restriction of the valve before activation of the automatic controller can eliminate the disadvantage of a low stabilization capacity.

In turn, the FPID-$P_2$ controller, which does not present loss of stabilization capacity as a function of slow actuation of the choke valve, practically maintains the response of the prior test, with only two events of slugging occurring again after the descending step.

Operation with an Unstable Setpoint

For a production system modeled for this invention, the setpoints have lower limits, below those at which the linear controllers tend to induce the occurrence of slugging. Furthermore, it is always recommendable to operate with a setpoint that is a little greater than its limit, thus avoiding small disturbances or changes in the characteristics of the process destabilizing the system, even if this implies a small reduction in production.

In the case of the PID-$P_1$ controller, the limit setpoints were determined in the previous tests as 67.8 bar in the modeling without fluctuations, and 68.0 bar in the modeling in which fluctuations were considered in the outflow from the well. Although the reduction of the setpoints below these values lead to slugging in the system, this is not the only way that a closed-loop production system may become unstable, as the changes in the characteristics of the plant may cause a stable setpoint to become unstable. Within the context of oil production, the change that can most easily cause this phenomenon is the reduction of the outflow from the well, caused by the natural depletion of the reservoir, and by problems in the well itself, such as obstruction of the piped region.

Figure 26:
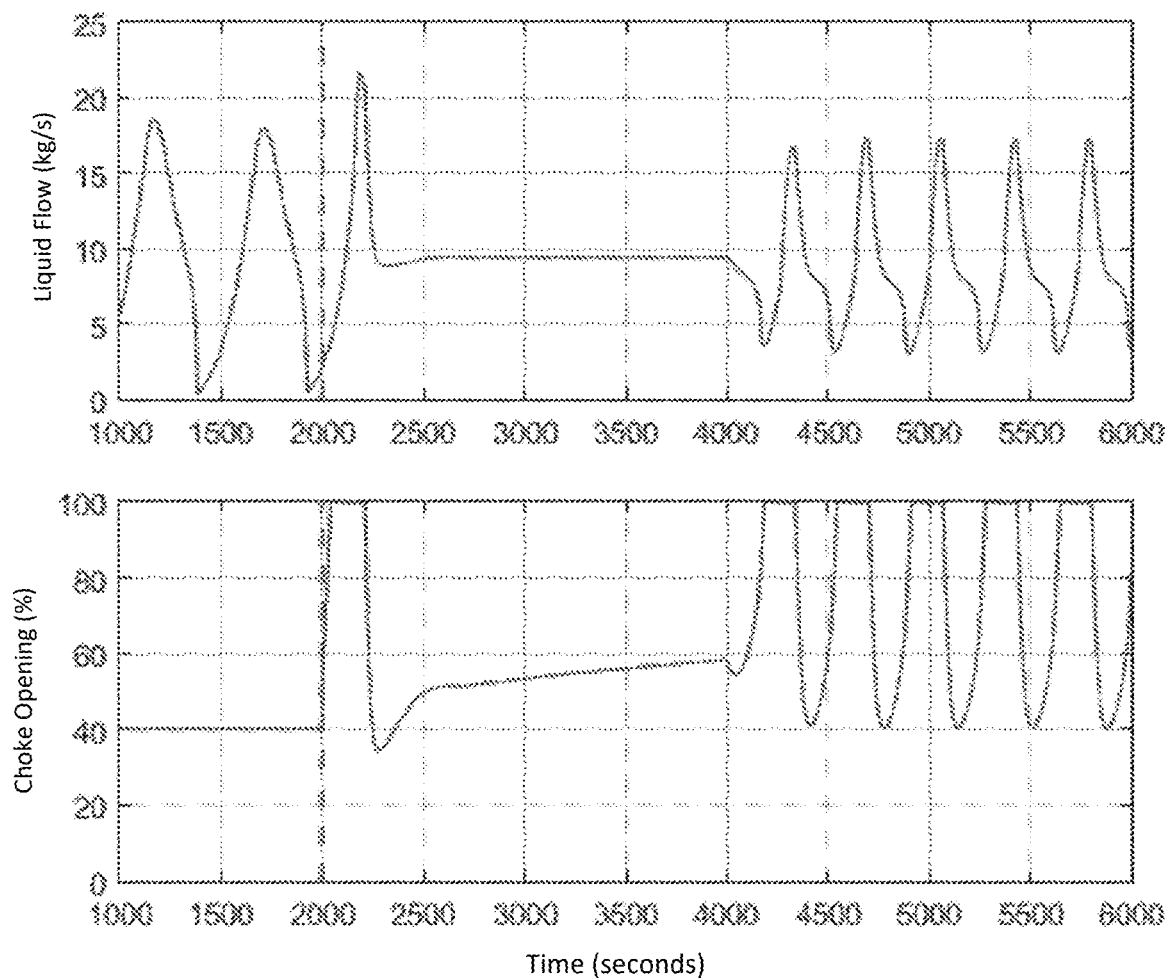
FIG. 26 shows the responses of the outflow and valve opening in the response test to changes in operating conditions done with the PID controller based on pressure at the base of the riser.

To verify the behavior of the FPID-$P_2$ and PID-$P_1$ controllers during the occurrence of changes in the characteristics of the process, a test was set up in which the apparent pressure of the reservoir is slightly reduced from 112.5 bar to 110 bar after stabilization of the flow. The responses of the outflow and the control signal to the PID-$P_1$ controller are presented in FIG. 26, in which it can be seen that the PID-$P_1$ controller was not able to stabilize the system after the small reduction in the apparent pressure of the reservoir because its setpoint ceased to be stable. In a real situation, the solution to this problem requires an operator to perceive the lack of control of the process, to identify the well that is slugging, and to adjust the setpoint of the controller.

One way of preventing these situations from occurring frequently is to adjust a setpoint that is farther away from the stability limit, thus preventing small variations in the process conditions from leading to instability. The problem of this solution is that it implies a decrease in production.

Figure 27:
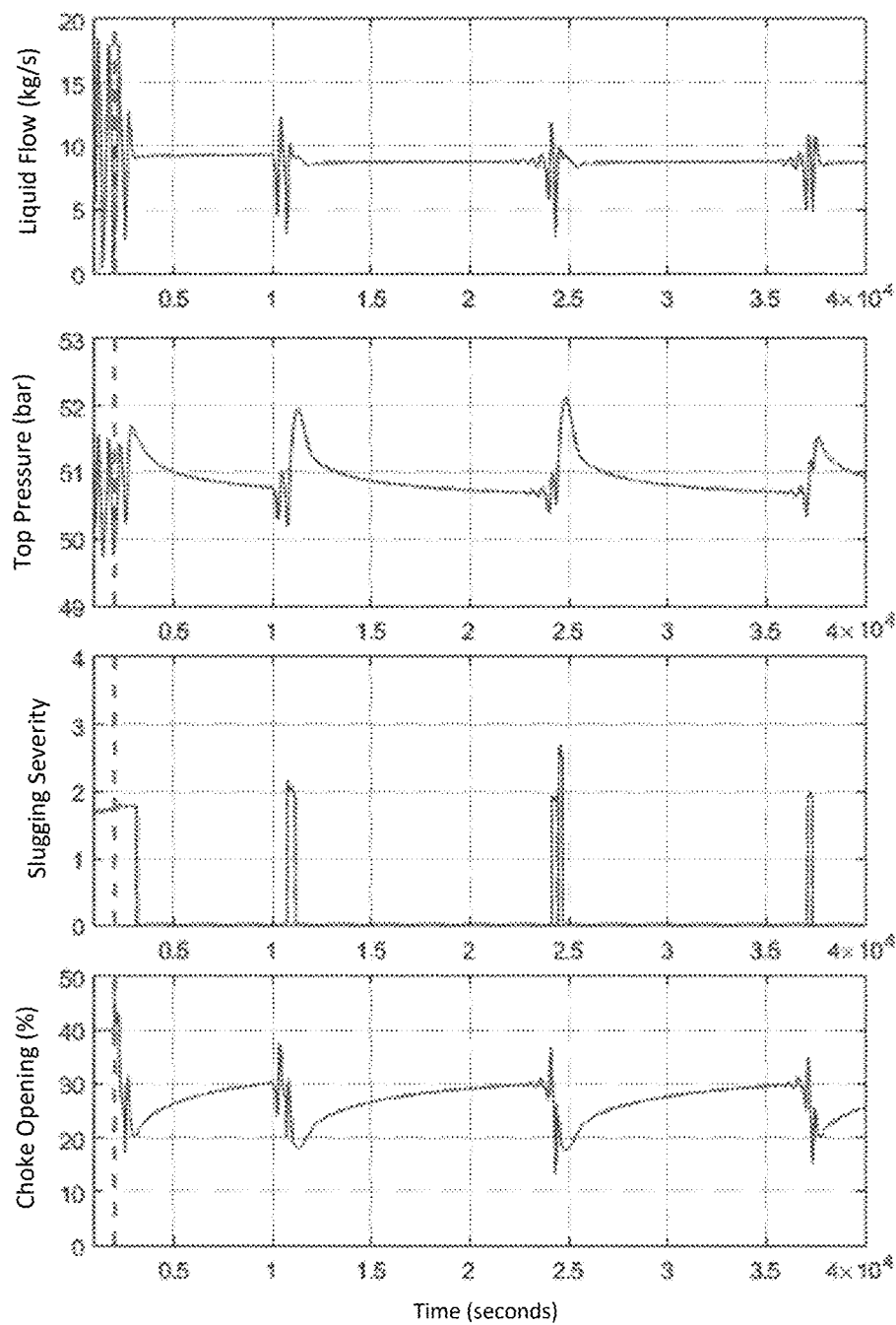
FIG. 27 shows the responses of the outflow and valve opening in the response test to changes in operating conditions done with the controller described in this document.

The same test was done with the FPID-$P_2$ controller, obtaining the results presented in FIG. 27, in which the outflow from the exit can be seen, the pressure at the top of the riser, the control signal, and the degree of slugging severity (8).

Before activation of the controller, marked by the line traced at 2000 seconds, the estimator continuously indicated the occurrence of slugging at an intensity of 1.8. After activation, this signal commands the heuristic close of the choke valve, as can be seen in the fourth chart, stabilizing the system.

After stabilization, the PID parcel (5) of the controller seeks the pressure setpoint normally, until at 10,000 seconds there is a decrease in the apparent pressure of the reservoir, leading to the occurrence of slugging, which is reflected in the top pressure, and promptly detected by the slugging severity estimator (6), which again acts heuristically in closing the valve until stabilization.

After the new stabilization, the PID parcel (5) of the controller again pursues the setpoint, which is now unattainable because it became unstable after the change in pressure, again leading to the formation of slugging, which is promptly detected and suppressed.

As the setpoint of the controller is constant, the process continues indefinitely, with generation of small slugs in the form of wavelets in the outflow from the exit point. In the top pressure, the only variable that the controller in fact sees, the deformation is much more significant, with deviations of up to 2 bar in relation to the setpoint. This exemplifies as a non-linear control action (3), which apparently harms the system by going against the classic objective of minimizing the error, and in truth this favors the control objective. This type of action, which cannot be implemented by a linear controller, allows this controller to perform well even being dependent on a low-quality variable for control purposes.

In this test, the average outflow obtained was 8.71 kg/s, slightly lower than the maximum outflow attainable with a stable setpoint, which became 8.74 kg/s after reduction of pressure in the reservoir, but significantly higher than the maximum outflow obtained through the static choking technique, 8.35 kg/s for the new conditions of the reservoir. This shows that from the production point of view, operation with an unstable setpoint is not a huge problem, and it may be preferable in relation to an operation whose setpoint is far away.

Naturally, operating with an unstable setpoint is not the ideal situation, but if this happens, the loss of performance of the FPID-$P_2$ controller is significantly less than that seen with the PID-$P_1$ controller. In addition, as the invented controller (1) has a slugging-severity estimator (6), it may be used to create an alarm on the operation screen, indicating an unstable operation and the need to readjust the setpoint.

The invention claimed is:

1. A slug-suppressing controller, comprising a fuzzy inference system (FIS) hybridized with a classic Proportional-Integral-Derivative (PID) controller to control a choke valve of an oil production system,
    wherein the slug-suppressing controller further comprises a block to estimate a severity of the slugging, and
    wherein the block to estimate the severity of the slugging is based on determining a frequency of oscillation based on the following algorithm:
    a. sampling an actual value of measured variable X(n), adding it to a buffer having a size L;
    b. calculating an average of the buffer X(1:L), storing it in $\overline{X}$;
    c. determining a sequence of average zero, $X^0(1:L)$, using equation: $X^0(1:L)=X(1:L)-\overline{X}$;
    d. calculating a variance of $X^0(1:L)$; if it is less than a threshold of $\sigma^2_{min}$, the oil production system is considered to be stable and the algorithm returns an oscillation frequency of zero;
    e. calculating self-correlation for X(1:L), storing it in $X_x(1:L)$;
    f. determining an index i of the element pertaining to $X_x(1:L)$, which has the greater value after the first crossover of zero;
    g. calculating a period of oscillation $T_g$ from the second equation, in which $T_a$ is the sampling time:

$$T_g = T_a(i-1);\text{ and}$$

h. returning a value of the oscillation frequency in mHz, calculated as $1000/T_g$.

2. The slug-suppressing controller of claim 1, wherein the slug-suppressing controller uses only a surface measurement, or a surface measurement with subsea measurements.

3. The slug-suppressing controller of claim 1, wherein the classic PID controller has variable overall gains.

4. The slug-suppressing controller of claim 1, wherein the FIS is responsible for adjusting the overall gain of the classic PID controller.

5. The slug-suppressing controller of claim 3, wherein variable overall gain of the classic PID controller decreases when the occurrence of slugging is detected.

6. The slug-suppressing controller of claim 1, wherein the FIS generates an additional restrictive choke valve-closing action, wherein the restrictive choke valve-closing action is a valve-closing action in addition to a closing action performed according solely to a PID algorithm.

7. The slug-suppressing controller of claim 1, wherein the FIS generates a heuristic action for closing the choke valve during the period of positive control error of the slugging cycle.

8. The slug-suppressing controller of claim 1, wherein the FIS includes two input variables: control error and degree of slugging severity; and two output variables: overall gain of the classic PID controller and restrictive action.

9. The slug-suppressing controller of claim 1, wherein a restrictive action is integrated with an output of the classic PID controller.

10. The slug-suppressing controller of claim 1, wherein the FIS includes functions of triangular and trapezoidal pertinence in the entry variables and singleton functions in output variables.

11. The slug-suppressing controller of claim 8, wherein rules for the FIS are based on a restrictive action output variable, which denote the following behavior:

a. if the oil production system is not slugging, then a restrictive action is unnecessary;
b. if the oil production system is slugging and the control error is negative, then the restrictive action is necessary;
c. if the oil production system is slugging and the control error is zero, then the restrictive action is necessary; and
d. if the oil production system is slugging and the control error is positive, then the restrictive action is not necessary.

12. The slug-suppressing controller of claim 8, wherein rules for the FIS are based on the output variable of the overall gain from the classic PID controller, which denote the following behavior:
   a. if the oil production system is slugging, then the overall gain is low;
   b. if the oil production system is not slugging and the control error is negative to a first threshold, then the overall gain is high;
   c. if the oil production system is not slugging and the control error is negative to a second threshold, then the overall gain is high;
   d. if the oil production system is not slugging and the control error is zero, then the overall gain is low;
   e. if the oil production system is not slugging and the control error is positive to a third threshold, then the overall gain is average; and
   f. if the oil production system is not slugging and the control error is positive to a fourth threshold, then the overall gain is high.

13. The slug-suppressing controller of claim 7, wherein the slug-suppressing controller uses a degree of slugging severity to create an instability alarm.

14. The slug-suppressing controller of claim 1, wherein the slug-suppressing controller guarantees operation with stable and unstable setpoints.

* * * * *